United States Patent [19]

Kimura et al.

[11] Patent Number: 4,930,090
[45] Date of Patent: May 29, 1990

[54] PEN RECORDER MOVED ACCORDING TO A DIGITAL SERVO CONTROLLER

[75] Inventors: Toshio Kimura; Yoshihiro Okano; Masahiro Otani; Shigenobu Miyamoto, all of Tokyo, Japan

[73] Assignee: Yokogawa Electric Corporation, Tokyo, Japan

[21] Appl. No.: 247,402

[22] Filed: Sep. 21, 1988

[30] Foreign Application Priority Data

Jan. 14, 1988 [JP] Japan ............................. 63-3538[U]
Feb. 29, 1988 [JP] Japan ................................ 63-47157

[51] Int. Cl.⁵ .......................................... G01D 15/16
[52] U.S. Cl. ............................... 364/520; 346/139 R; 346/140 R
[58] Field of Search .................. 364/518, 520, 521; 346/2, 33 TP, 33 R, 35, 49, 123, 139 R, 139 C, 140 R, 140 A

[56] References Cited

U.S. PATENT DOCUMENTS

| | | | |
|---|---|---|---|
| 4,435,772 | 3/1984 | Suzuki et al. | 364/520 |
| 4,577,206 | 3/1986 | Hibino | 364/520 X |
| 4,613,872 | 9/1986 | Naito et al. | 364/520 X |
| 4,686,540 | 8/1987 | Leslie et al. | 364/520 X |
| 4,794,406 | 12/1988 | Niemeyer, III | 346/139 R |

Primary Examiner—Gary V. Harkcom
Assistant Examiner—H. R. Herndon
Attorney, Agent, or Firm—Moonray Kojima

[57] ABSTRACT

A pen recorder for recording a magnitude of a measured signal with a pen which is moved in accordance with a digital servo controller. High performance and function are attained by using ASIC with simple interactive operation. A novel pen mechanism is used for recording. High quality is achieved at low cost by selecting a pen of adequate pen pressure in accordance with recording velocity.

14 Claims, 27 Drawing Sheets

Fig.17
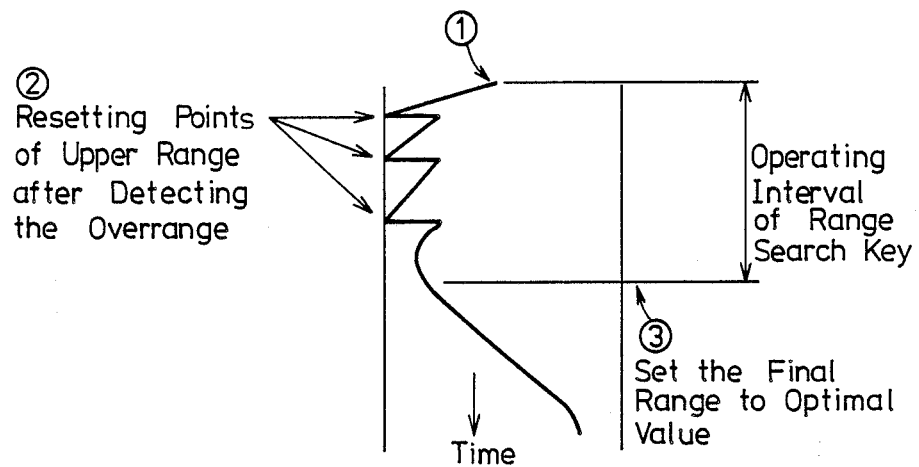
Fig.18(a)    Fig.18(b)
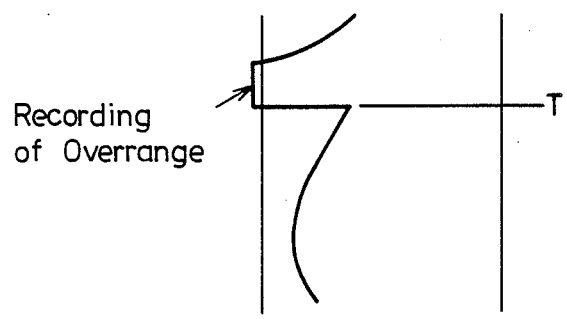
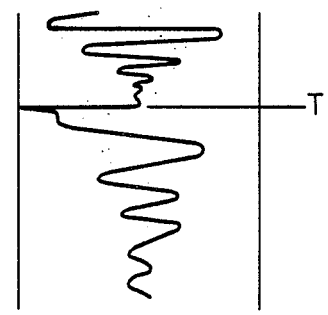

Fig.27   Fig.28
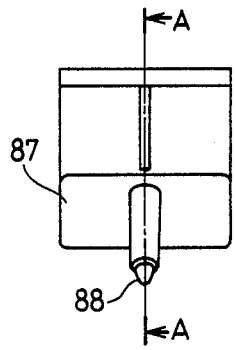
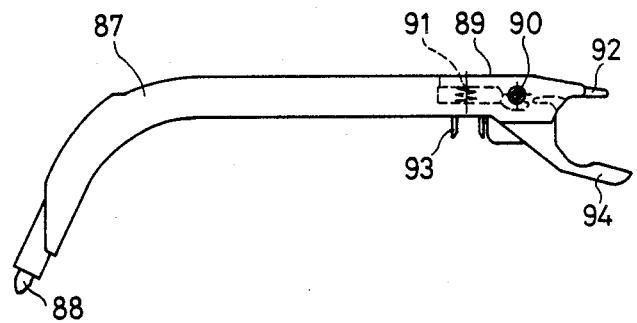
Fig.29
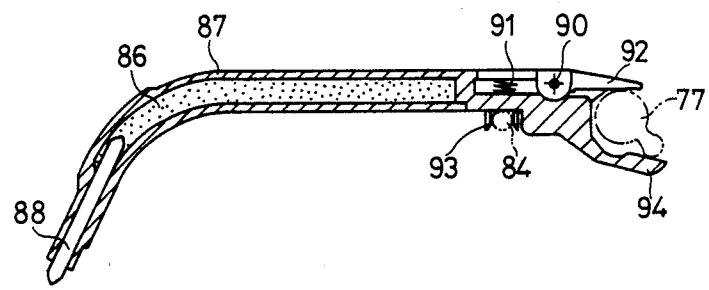

PEN RECORDER MOVED ACCORDING TO A DIGITAL SERVO CONTROLLER

BACKGROUND OF THE INVENTION

1. Field of Invention

This invention relates to a pen recorder for recording a magnitude of a measured signal with a pen driven in accordance with a digital servo controller.

2. Description of the Prior Art

A conventional pen recorder, which is widely used in a variety of fields, records time variation measured signals on a chart with a pen which moves in accordance with a servo controller on the basis of the value of the measured signal which is converted into an electric signal.

One example of a conventional pen recorder involves a multipen recorder which is constructed with a plurality of pens arranged at given spacings in a direction whereby a chart fed in order to record relatively each of a plurality of measured signals on the chart.

The conventional multipen recorders are classified into two types, the first being an analog technique based recorder and the second being a microprocessor technique based recorder. There are disadvantages to both types, as well as advantages to both types.

The analog technique based recorder is relatively small and simple in operation, and the cost thereof is relatively low. However, disadvantageously, this type of recorder lacks storage capabilities and cannot execute data arithmetic processing.

The microprocessor type recorder is capable of performing multiple digital arithmetic operations and ahieves highly accurate recording results. However, this type of recorder is difficult to miniaturize and is difficult to set measuring and arithmetic conditions therein.

Moreover, with the conventional pen mechanism, it is difficult to select a pen having a suitable pen pressure according to recording velocity. Also, it is impossible to achieve high quality recording when the recording velocity fluctuates sharply.

SUMMARY OF THE INVENTION

Accordingly, it is an object of the invention to overcome the aforementioned and other disadvantages, deficiencies and problems of the prior art.

Another object is to provide a pen recorder which is capable of effecting a variety of digital arithmetic operations by using a microprocessor, of obtaining highly accurate recorded results, of making both the size and cost thereof relatively small, and of easily setting the measuring and arithmetic conditions.

The foregoing and other objects are attained by the invention which provides a novel pen mechanism which is capable of acquiring high quality recorded results by using a pen of suitable pen pressure which is adjusted to the recording velocity even when the recording velocity sharply fluctuates.

BRIEF DESCRIPTION OF THE DRAWINGS.

FIGS. 17, 18(A) and 18(B) are graphs depicting examples of measured records.

FIG. 27 is a front elevation view of the pen mechanism of FIG. 26.

FIG. 28 is a side view of FIG. 27.

FIG. 29 is a partial sectional view taken along section line A—A of FIG. 27.

DETAILED DESCRIPTION OF PREFERRED EMBODIMENTS

Figure 1:
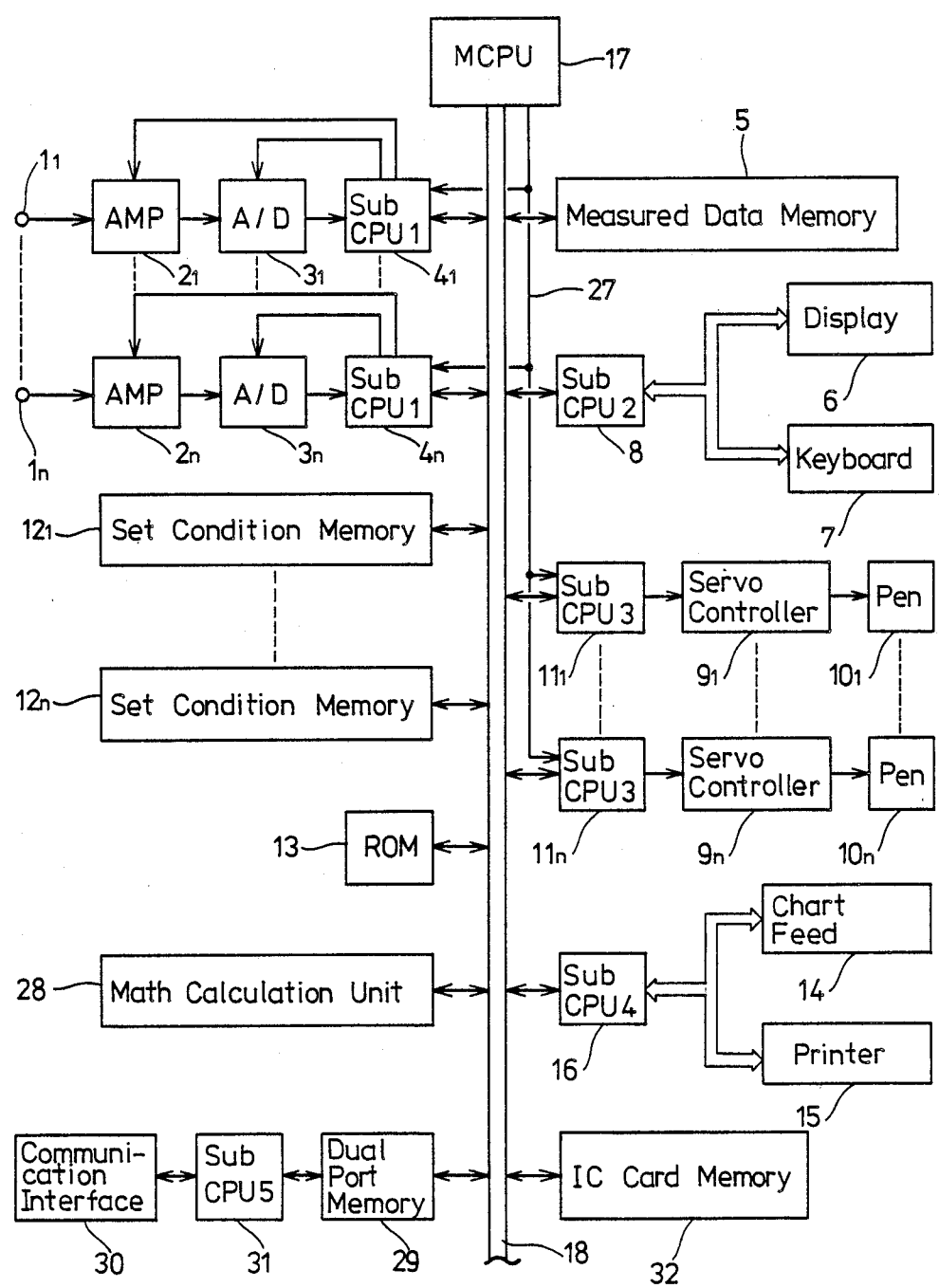
FIG. 1 block diagram depicting an illustrative embodiment of the invention.

Turning to FIG. 1, the embodiment comprises an input terminal $1_l \ldots 1_n$, for each channel, for inputting measured analog signals associated with a physical quantity of a measured object. The measured analog signals, applied to the input terminals $1_l \ldots 1_n$, are standardized to respectively have given magnitudes by means of an amplifier $2_l \ldots 2_n$, for each channel, the gains of which are adjusted in accordance with an input range. Subsequently, the analog signals are applied to an analog to digital (A/D) converter $3_1 \ldots 3_n$, for each channel, wherein the signals are converted into digital signals. A first subsidiary central processing unit (SUB CPU 1) $4_1 \ldots 4_n$, for each channel, controls both amplifiers $2_1 \ldots 2_n$ and A/D converter $3_1 \ldots 3_n$ for each channel $1 \ldots n$. These digital signals are temporarily stored in a measured data memory 5. The embodiment further comprises a display 6 for digitally displaying the measured data, and a keyboard 7 for inputting set conditions for respective record channels. Display 6 and keyboard 7 are controlled by a second subsidiary central processing unit (SUB CPU2) 8. A servo controller 9 is provided for analog recording the magnitudes of measured data in the form of a continuous line on a chart by moving pens $10_1 \ldots 10_n$ in accordance with the magnitudes of the measured data.

Servo controllers $9_1 \ldots 9_n$ are controlled by third subsidary central processing units (SUB CPUB3) $11_1 \ldots 11_n$. A set condition memory $12_1 \ldots 12_n$ stores the set measured data for each record channel. A read only memory (ROM) 13 is provided for storing fixed data associated with the measurement and programs corresponding to a series of measuring procedures. The embodiment further comprises a chart feed 14, and a printer 15 for printing character symbols on the chart, chart feed 14 and printer 15 being controlled by a fourth subsidiary central processing unit (SUB CPU4) 16. Also provided are a communication interface 30, a subsidiary central processing unit 31, a dual port memory 29, and an integrated circuit card memory 32. A main central processing unit (MCPUB) 17 is connected through a bus 18 to each component, as depicted.

Figure 2:
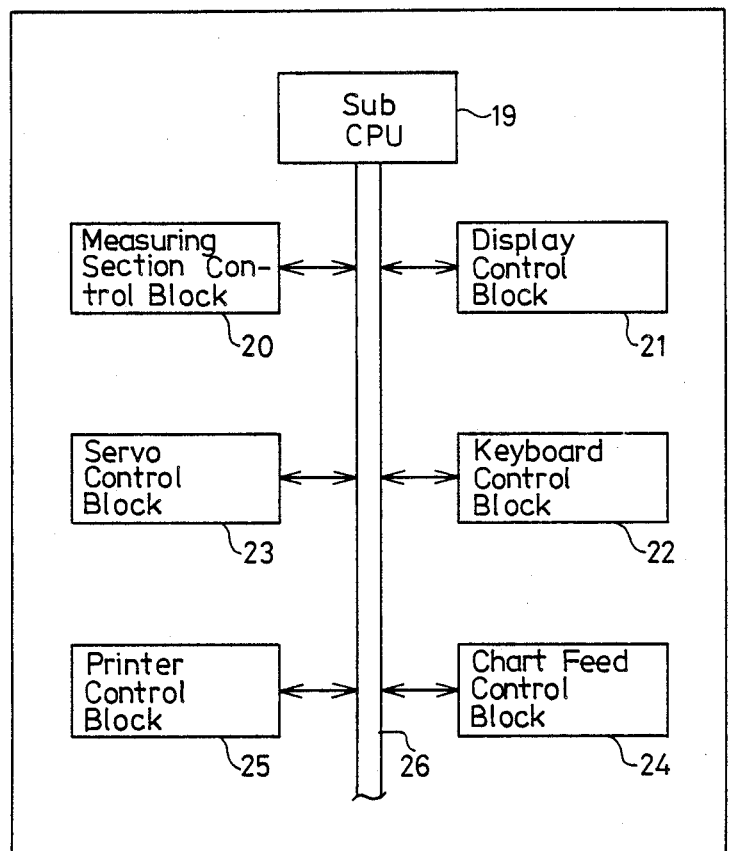
FIG. 2 is a block diagram depicting an example of a SUB CPU depicted in FIG. 1.

Referring next to FIG. 2, each of the subsidiary central processing units 4,8,11 and 16, which is constructed of a semiconductor integrated circuit, comprises a measuring section control block 20, a display control block 21, a key board control block 22, a servo control block 23, a chart feed control block 24, a printer control block 25, and a subsidiary central processing unit 19 connected to the foregoing components via a bus 26, as depicted.

More specifically, supposing that the number of record channels is 8, then 18 semiconductor integrated circuits, such as depicted in FIG. 2, are used, and control elements corresponding to individual control objects are selectively used. A step prerequisite for selecting these control elements is to connect the circuit element associated with each control object to a previously assigned connecting pin of the semiconductor integrated circuit.

Turning again to FIG. 1, synchronous clocks, which may be pulses or other signals, relative to sampling intervals are parallely applied from MCPU 17 through a signal line 27 to SUB CPU4 for controlling the measuring section and to SUB CPU11 for controlling the servo controller $9_1 \ldots 9_n$. A mathematic calculation unit 28 performs a variety of arithmetic operations. Dual port memory 29 receives and transfers data via a communications interface 30. Calculation unit 28 and dual port memory 29 are controlled by a fifth subsidiary central processing unit (SUB CPU5) 31. An attachable and detachable IC (integrated circuit) card memory 32 is used to store data or the set conditions.

The MCPU 17 controls the components as a whole including the SUB CPUs 4,8,11 and 16. The SUB CPUs 4,8,11 and 16 in turn control the functional blocks, such as shown in FIG. 2, under the control of MCPU 17 so that the magnitudes of the measured signals are analog recorded for each recording channel.

Figure 3:
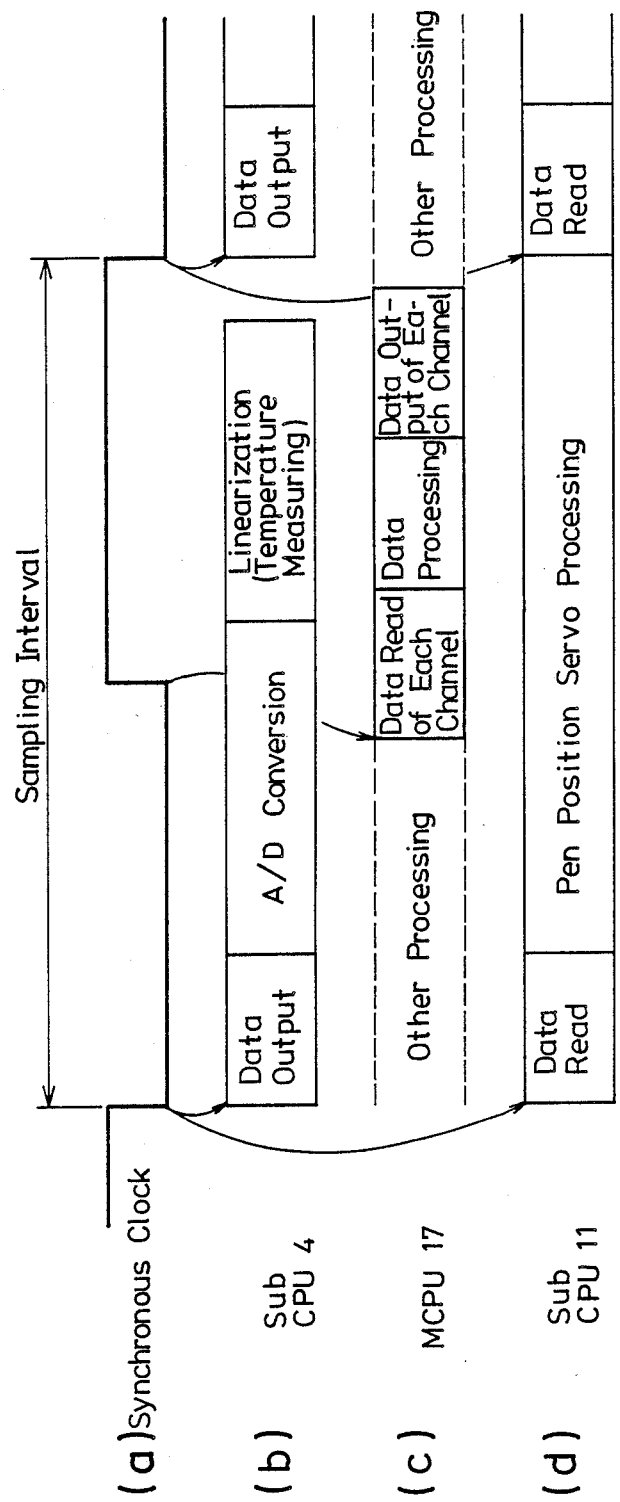
FIG. 3, comprising lines (A)—(D), is a timing chart depicting the operations of the embodiment of FIG. 1.

Turning to FIG. 3, line (A) depicts a synchronous clock; line (B) depicts an operational state of the SUB CPU4 for controlling the measuring section; line (C) depicts an operational state of MCPUB 17; and line (D) depicts an operational state of SUB CPU11 for controlling the servo controller. At the last transition of the synchronous clock, SUB CPU4 outputs the digital data which have undergone A/D conversion to MCPU 17 and then initiates the A/D conversion. Simultaneously, SUB CPU11 reads the digital data from MCPU 17 and initiates pen position servo processing of the digital data as a target value. On the other hand, at the first transition of the synchronous clock, MCPU 17 serially reads the digital data from SUB CPU4 and effects data processing. Subsequently, MCPU 17 serially outputs the processed data to SUB CPU11.

With the above embodiment, it is possible to use common type SUB CPUs so that the number of types of circuits is decreased substantially and hence costs can be reduced substantially. Also, the MCPU 17, SUB CPU4 for controlling the measuring section, and SUB CPU11 for controlling the servo controller, all function in accordance with the synchronous clocks. Hence, no fluctuation in synchronous relation between sample rates is created. Also, it is possible to prevent noises from being produced in the servo controller and to prevent distortion from being caused in the record waveform which is attributed to the fluctuations in synchronous relation between the sample rates. To be more specific, according to the conventional multipen recorder, the MCPU issues a sample command to the measuring section, and the data are inputted to the servo controller in connection with the data output from the measuring section. If the servo controller varies the servo target value simultaneously when the servo controller inputs the data, the synchronous relation between the sample rates fluctuates, thereby to cause distortion in the record waveform and noises in the servo controller. When performing operation at a high speed sample rate, the foregoing adverse influences are great in conventional arrangements.

Figure 4:
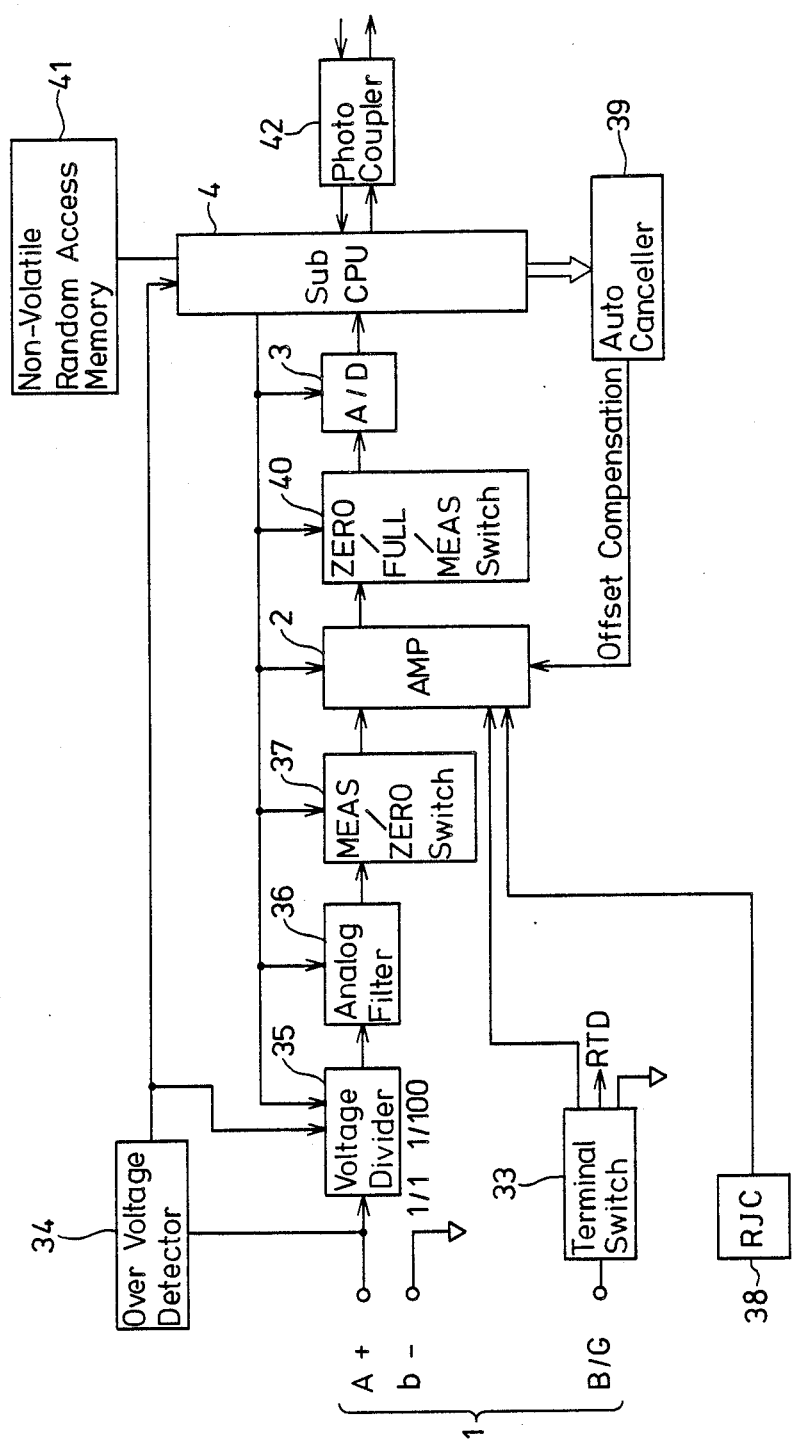
FIG. 4 is a block diagram depicting an example of a measuring section depicted in FIG. 1.

In FIG. 4, the measuring section is depicted as comprising switch 33 for manual changing over a connecting position of a third terminal B/G in accordance with inputs, for example, of a DC voltage, resistance temperature detectors (RTDs) and thermocouples (TCs). An over voltage detector 34 detects input over voltage. Subsequent to the detection of an input over voltage, a voltage dividing ratio of voltage divider 35 is varied from 1/1 to 1/100, thereby to protect the measuring section. Output signals from voltage divider 35 are transmitted via analog filter 36 and a measure zero switch 37 to an amplifier 2. The measure zero switch 37 is an auto zero circuit for measuring the offset by automatically changing over the input of the amplifier of the next stage to an input signal state and to an input 0 state with an FET switch.

Figure 5:
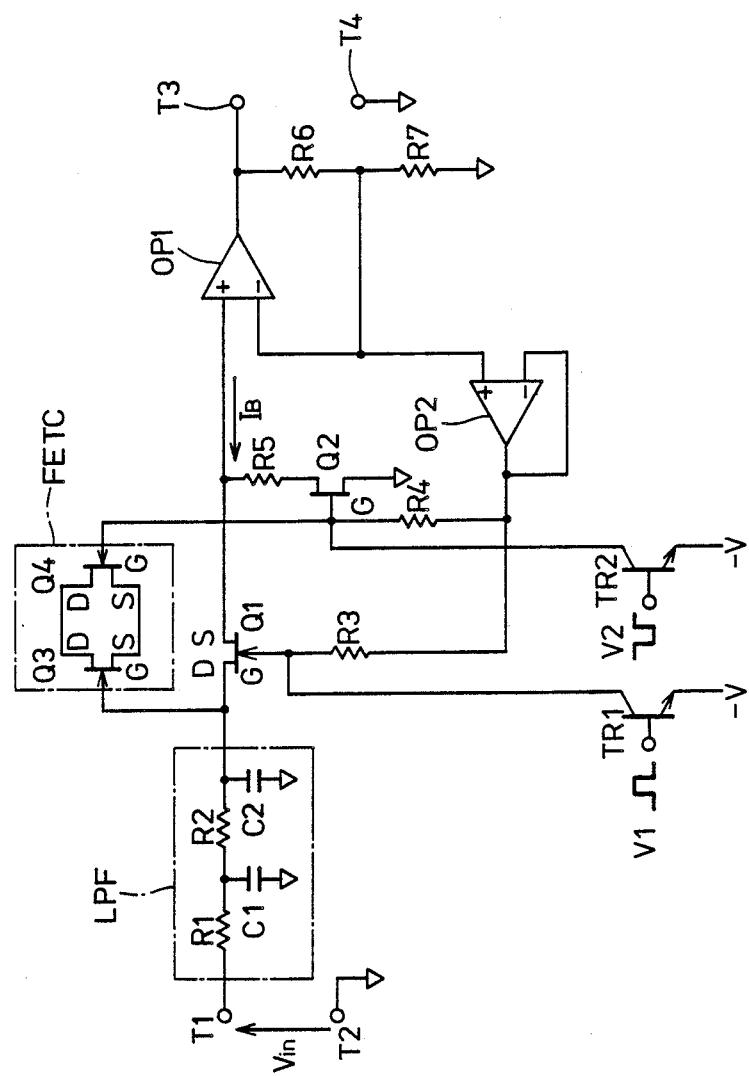
FIG. 5 is a circuit diagram depicting an example of an auto zero circuit.

An example of the auto zero circuit is shown in FIG. 5, wherein input terminals T1 and T2 have a signal voltage Vin and common potential point connected thereto. One end of a resistance R1 is connected to input terminal T1, and the other end is connected to one end of a resistance R2. Resistance R1 is also connected via a capacitor C1 to the common potential point The other end of resistance R2 is connected to a drain terminal of FET switch Q1 and is further connected through a capacitor C2 to the common potential point. Resistances R1 and R2 and capacitors C1 and C2 combine to form a low pass filter LPF. A source terminal of FET switch Q1 is connected to an non-inversion (+) input terminal of an arithmetic amplifier OP1, and is at the same time connected to one end of a resistance R5. The other end of resistance R5 is connected to a drain terminal of a second FET switch Q2, while a source terminal of the FET Q2 is connected to the common potential point. One end of a resistance R6 is connected to an output terminal T3 and to an output terminal of arithmetic amplifier OP1, and the other end of resistor R6 is connected to an inversion (−) input terminal of arithmetic amplifier OP1 and to a non-inversion (+) input terminal of an arithmetic amplifier OP2. The other end of resistance R6 is further connected via a resistance R7 to the common potential point.

An output terminal T4 is connected to the common potential point. Connected to the output terminal of arithmetic amplifier OP2 is the inversion (−) input terminal thereof. The output terminal of arithmetic amplifier OP2 is also connected through resistance R3 to a gate terminal of FET Q1 and is also connected via resistance R4 to a gate terminal of FET Q2. The collector terminal of transistor TR1 is connected to the gate terminal of FET Q1, while the collector terminal of transistor TR2 is connected to the gate terminal of FET Q2. Negative voltages −V are impressed on the emitters of transistors TR1 and TR2. Simultaneously, ON and OFF signals V1 and V2, which are in anti-phase with respect to each other, are applied to base terminals of transistors TR1 and TR2. FET switches Q3 and Q4 have the same characteristics as those of FET switch Q1, and the drain terminals thereof are connected to each other and the source terminals are connected to each other, as depicted. The gate of FET Q3 is connected to the drain of FET Q1, while the gate of FET Q4 is connected to the gate of FET Q2. These FET Switches Q3 and Q4 cooperate to constitute an FET circuit FETC.

In the auto zero circuit, noises of the signal voltages Vin which are received by input terminal T1 are eliminated by low pass filter LPF. Thereafter, signal voltages Vin are turned ON and OFF by means of FET Q1 and FET Q2 which are driven in anti-phase with respect to each other in accordance with transistors TR1 and TR2, and are amplified by arithmetic amplifier OP1. When FET Q1 is kept ON, FET Q2 is turned OFF. The output signals from the low pass filter LPF are amplified by amplifier OP1, while signals corresponding to the input signals Vin are outputted to output terminals T3 and T4. When FET Q1 is kept OFF, FET Q2 is turned ON. The non-inversion (+) input terminal of arithmetic amplifier OP1 assumes a level of 0V, and voltages corresponding to the offset voltages of amplifier OP1 are outputted to output terminals T3 and T4. The signals outputted from output terminals T3 and T4 are converted into digital signals, and a difference therebetween is thereby obtained As a result, it is possible to eliminate the adverse influence given by the offset of the amplifier OP1.

In the FETC circuit, electrostatic capacities between the gates of the two FETs Q3 and Q4 are arranged such that two gate and source electrostatic capacities connected in series are parallely connected to two gate and drain electrostatic capacities connected in series. Since FETs Q3 and Q4 have the same properties as FET Q1, the capacity characteristics including temperature characteristics are much the same as those of FET Q1. The gate of FET Q4 is in anti-phase with respect to the gate of FET Q1, i.e. the gate of FET Q4 is driven in phase with respect to gate of FET Q2. Consequently, a spike current, whose polarity is opposite to that of another spike current coming from the gate of FET Q1, is allowed to flow in capacitor C2. Such offset of spike currents prevents the offset voltage from being generated in capacitor C2, and drift of the offset, which is due to variations in temperature can also be prevented by virtue of matching of the temperature characteristic of a compensation capacity. Feedback voltages from amplifier OP2 serve to impart ON time bias voltages to the gates of FETs Q1 and Q2.

Referring again to FIG. 4, a temperature sensor 38 is provided for compensation of a reference contact point, the output signal of which is applied to amplifier 2. An auto canceller 38 is provided for restraining the amount of offset of amplifier 2 to a smaller value. Voltages having opposite polarity are impressed through, for example, an 8 bit D/A converter on amplifier 2. A zero and full measurement switch 40 is intended to effect zero and full scale measurement and automatic compensation for maintaining high accuracy of performance of the A/D converter of the next stage. A non-volatile RAM 41 (NVRAM), such as an EEPROM, is provided for storing error data of voltage divider 35 and gain error data of amplifier 2. The SUB CPU 4, which comprises a one chip microprocessor, controls each individual element of the measuring section. In addition, SUB CPU4 performs a variety of compensating arithmethic operations, linearization and digital filtering function at, e.g. 135 Hz cycles, and transmits the measured data via a photocoupler 42 to MCPU 17.

Figure 6:
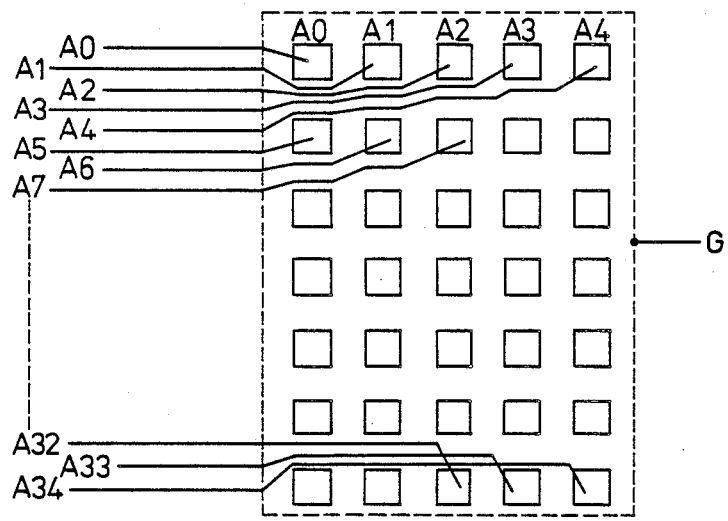
FIG. 6 is an explanatory drawing depicting an example of a matrix of display elements.

The display 6 of FIG. 1 is a multidigit display in which a plurality of matrix display elements are arranged in a matrix. FIG. 6 depicts such matrix display elements comprising, e.g., 35 pieces, given by a 5×7 array, of display elements formed of anodes $A_0$ to $A_{34}$, and a single piece of grid G common to anodes $A_0$ to $A_{34}$. In fact, a multidigit, for example, a 20 digit display is constructed in such a manner that 20 pieces of matrix display elements are arranged in a matrix and the grid common to the matrix display elements is so led to the outside as to be driven separately. Anodes $A_0$ to $A_{34}$ in the same positions are parallely connected to each other. The display elements are selectively lit up or extinguished according to driving combinations of the grid and anodes.

Figure 7:
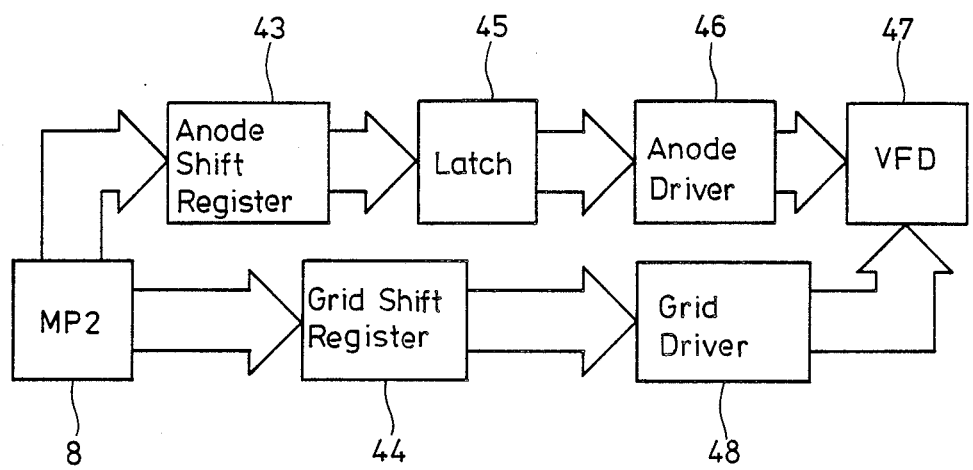
FIG. 7 is a block diagram depicting an example of a driving circuit for a multidigit display.

In FIG. 7, serial data are imputted from SUB CPU8 to an anode shift register 43 and to a grid shift register 44, respectively. Shift registers 43 and 44 serve to convert the serial data transmitted from SUB CPU8 into parallel data. The parallel data, which have been converted by anode shift register 43, are applied via a latch 45 and an anode driver 46 to the anodes of a fluorescent display tube (VFD) 47. On the other hand, the parallel data, which have been converted by grid shift register 44, are applied via a grid driver 48 to the grid of fluorescent display tube 47.

As a result, the display elements of the respective digits of tube 47 are selectively lit up or extinguished according to the driving combination of the grid and anodes.

Figure 8:
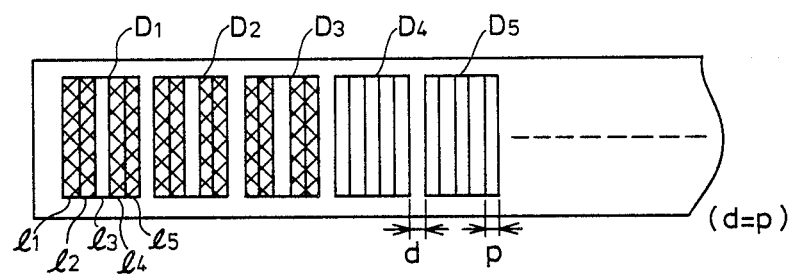
FIG. 8 is an explanatory drawing depicting an array of display elements of the multidigit display.

In FIG. 8, matrix display elements $D_1 .. D_5$ are so arranged that spacing d between adjacent matrix display elements is equal to an array pitch p of the display matrix.

A bar graphic display is shown which uses the described multidigit display, wherein among five display lines $1_1 \ldots 1_5$, as depicted in FIG. 8, the central one line $1_3$ continues to be extinguished, while two sets of lines $1_1, 1_2, 1_4$ and $1_5$, between which line $1_3$ is sandwiched, are selectively driven so as to be lit up.

Consequently, the matrix display elements D are virtually divided by half so that the resolving power in the bar graphic display is improved twice as much as that in the prior art matrix display element basis driving.

Figure 9:
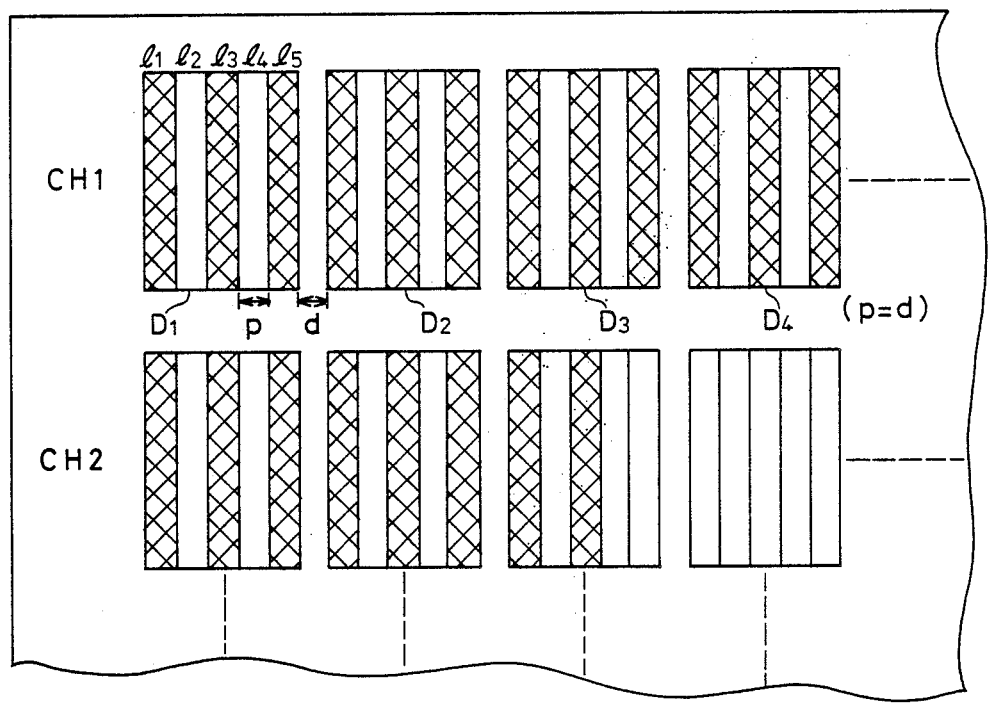
FIG. 9 is an explanatory diagram depicting another array of display elements.

In FIG. 9, matrix display elements D are similarly arranged so that the spacing d between adjacent matrix display elements is equal to the array pitch p of every display matrix. In the case of providing the bar graphic display, even numbered lines $1_2$ and $1_4$ among five display lines $1_1 \ldots 1_5$ of each digit invariably remain extinguished, while the odd numbered lines $1_1, 1_3$ and $1_5$, are selectively lit up.

Hence, the matrix display elements $D_1 \ldots D_4$ are virtually divided into three parts so that the resolving power in the bar graphic display is improved by three times as much as that in the conventional matrix display element basis driving.

The digital multidigit display is performed by use of the multidigit display wherein the plurality of matrix display elements are arranged in a matrix. It is also feasible to display the magnitudes of measured data with relatively high resolving power in the form of a bar graph.

Although a fluorescent display tube was shown used as the matrix display element in the above embodiment, other similar devices can be used, such as, for example, liquid crystals, light emitting diodes, ELs, etc. Where the dynamic driving process is executed by using light emitting display elements as a multidigit display, it is also practicable to split the respective electrodes of the light emitting display elements into a plurality of groups and parallelly apply the individual electrode display data, with the result that a decline in luminance can be improved without increasing the driving voltage even when there is an incremental increase in the number of display digits.

Figure 10:
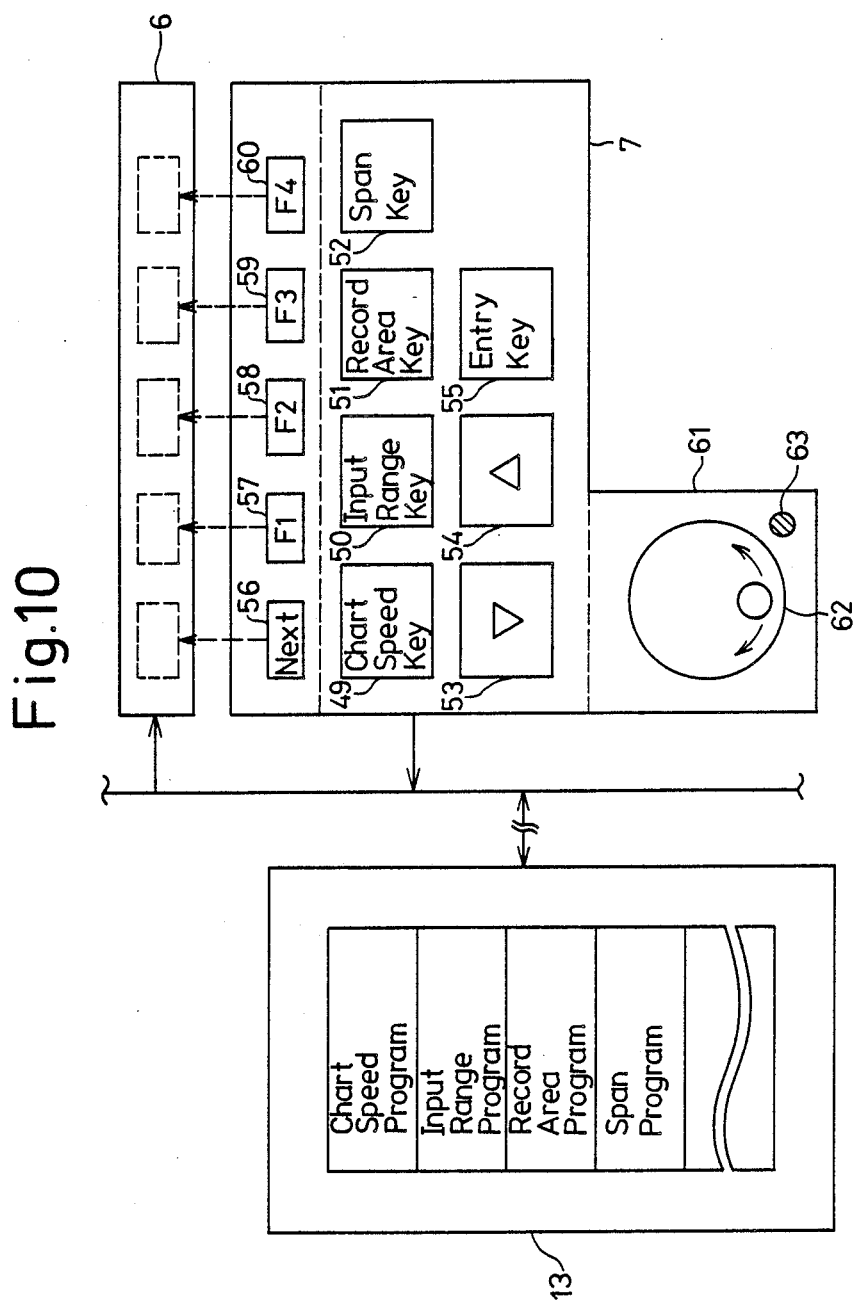
FIG. 10 is a block diagram depicting an example of a man machine interface depicted in FIG. 1.

FIG. 10 shows key board 7 which is equipped with a plurality of keys 49 to 52 for selecting respective items of the following set conditions as a menu: a chart speed, an input range, a record area and a span; cursor keys 53 and 54 for scrolling a display picture on display 6; an entry key 55 for effecting the entry of set data; a next key 56 for changing over each function of the function keys which is indicated on the picture of display 6 concurrently when being indicated; and a plurality of function keys 57 to 60 which function as soft keys in association with display contents of the display 6; and a rotary encoder 61 for varying set values in the items of the selected set conditions in connection with rotary operation.

The surface of rotary encoder 61 is provided with a monitor lamp 63 for indicating operation conditions of a rotary operation unit 62 for performing rotary driving from the outside and of rotary encoder 61. Stored in ROM 13 are a plurality of programs, defined as a table, which correspond to such set condition items as the chart speed, input range, record area and span which are all selected as menus by key board 7.

Figure 11:
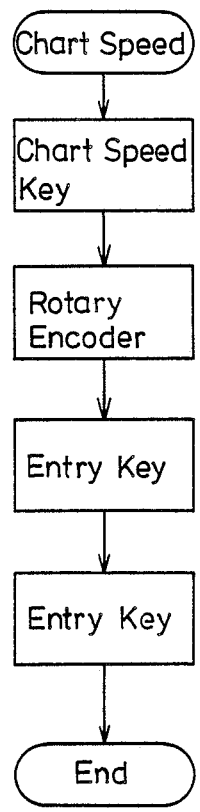
FIGS. 11,12,13 and 14 are flow charts depicting the operation of the man machine interface.

The man machine interface of FIG. 10 will now be described with reference to the flow charts of FIGS. 11, 12, 13 and 14, wherein FIG. 11 is a flow chart showing the setting of the chart speed. The operation starts with the step of pushing down the chart speed key 49 of key board 7, so that the chart speed program stored in ROM 13 is executed. Then, the chart speed comes into a settable menu mode, and display 6 is set to a chart speed setting picture. Subsequently, monitor lamp 63 of rotary encoder 61 is lit up, and the output signals from rotary encoder 61 are brought into an effective state. More specifically, a plurality of preset chart speeds are sequentially indicated stepwise on the setting picture of display 6 by rotating rotary operation unit 62 of rotary encoder 61. The rotation is made to cease just when indicating a desired chart speed. The desired chart speed it thus selected.

In this menu mode, the soft keys are selectively setting mm/Hour or mm/minute are indicated at the corresponding portions to function keys 57 to 60 of display 6, and any one of the can be set. The speed data are stored in the previously assigned set condition memory by pushing down entry key 55 in a state where the desired speed is indicated. Then, the operator varies the chart speed. If the chart speed is to be varied once again, it is enough to rotate rotary encoder 61. When completing the speed setting operations, entry key 55 is pushed down continuously twice. At the time of the second push down of entry key 55, an exit from the menu mode is made. In this embodiment, the speed data are updated by pushing down entry key 55. The speeds may, however, sequentially be varied in connection with the rotation of rotary encoder 61 according to the application desired. Besides, it is possible to arbitrarily set speeds other than the preset speed as desired.

Figure 12:
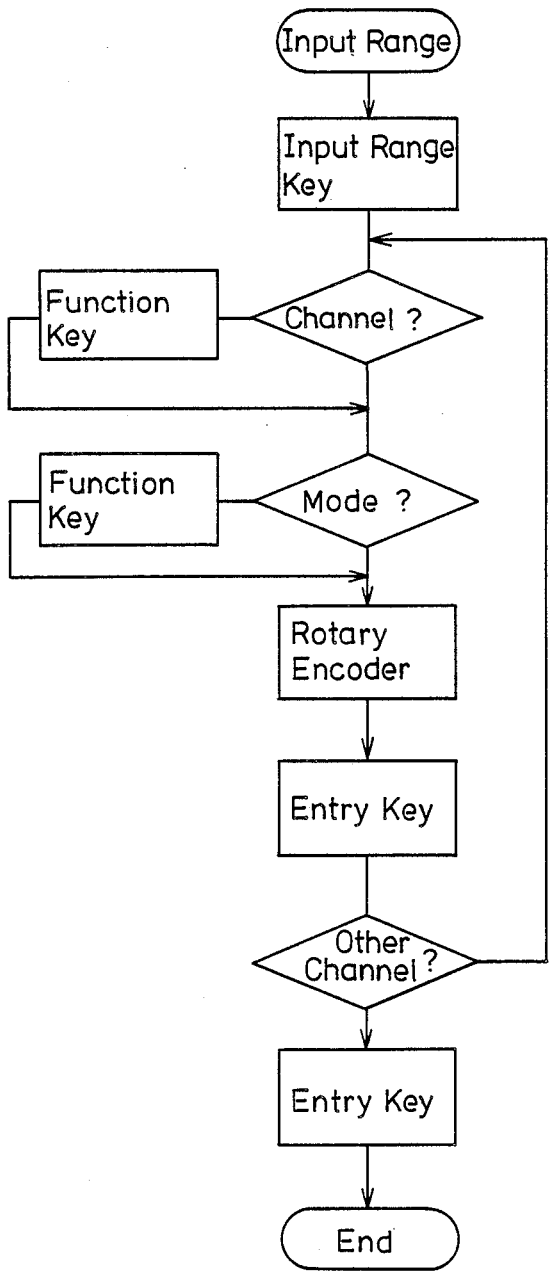

The flow chart of FIG. 12 depicts the operations involving setting of the input range wherein an input range key 50 of key board 7 is, at first pushed down so that an input range program stored in ROM 13 is executed. The input range enters a settable menu mode. Then, an input range setting picture is indicated on display 6. The first setting picture to be displayed is a channel selecting picture. A desired channel is selected by use of the function key. Upon selection of the desired channel, a mode selecting picture is indicated as a setting picture, and a desired mode is selected according to the function key. After the mode has been selected, monitor lamp 63 of rotary encoder 61, is lit up, and the output signals from rotary encoder 61 are put into an effective state. Namely, a plurality of preset input ranges are sequentially indicated stepwisely on the setting picture of the display 6 by rotating the rotary operation unit of rotary encoder 61.

A desired input range can be selected by halting the rotation just when the desired input range is indicated. In this menu mode, the input range data are stored in the set condition memory individually assigned for every measuring channel in association with the rotation of rotary encoder 61, while the input range varies as encoder 61 rotates. It follows that pen position changes with the rotation of encoder 61. The setting of the input range with respect to a given channel, which has thus been selected, is completed by pushing down entry key 55 just when selecting the desired input range. If the input range is to be varied once again, encoder 61 is rotated. In the case of setting the input range for other channels, the operations subsequent to the channel selecting step are repeated a corresponding number of times to the number of channels desired. Where the input range setting operations are to be ended, entry key 55 is pushed down continuously twice. At the time of the second push down of entry key 55, the input range exits the menu mode.

Figure 13:
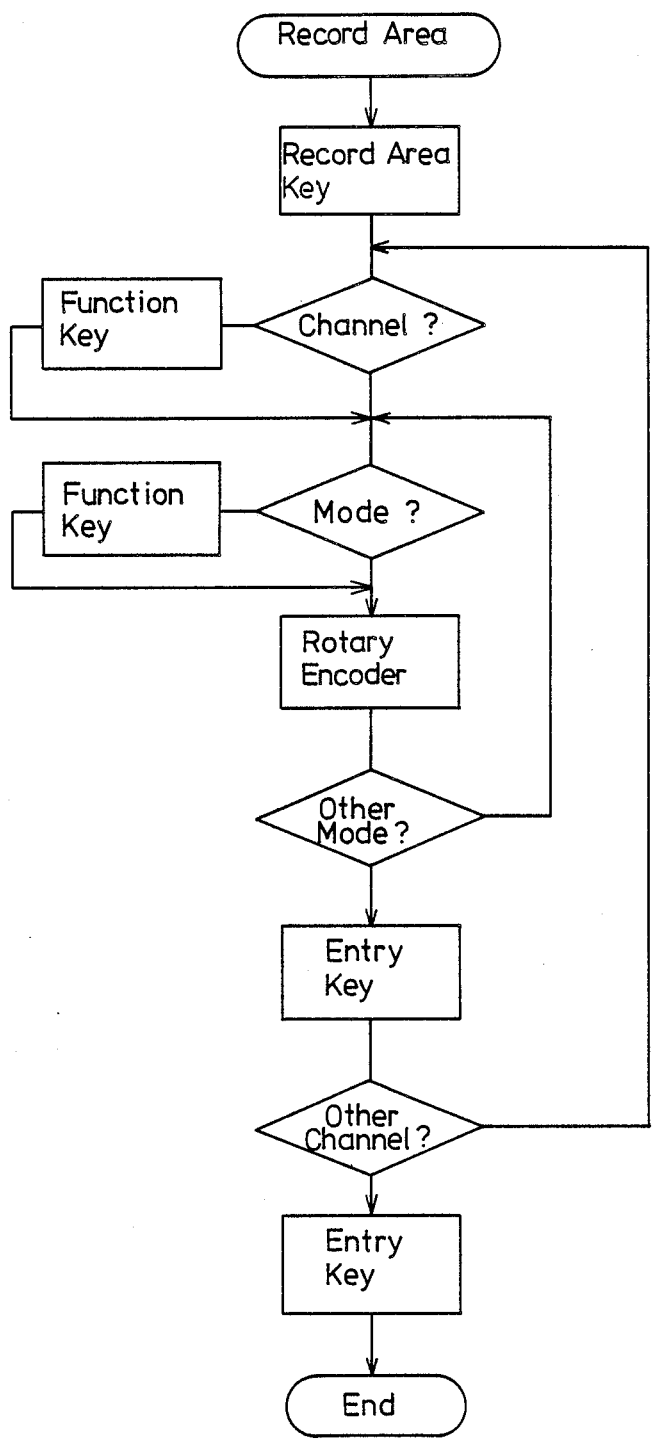

FIG. 13 is a flow chart showing adjustment of the record area, wherein the first step is to push down the record area key 51 of key board 7, so that the record area program which is stored in ROM 13 is executed. The record area enters a settable menu mode. A record area setting picture is indicated on display 6. The first setting picture to be displayed is a channel selecting picture. A desired channel is selected by use of the function key. Upon selection of the desired channel, a setting object selecting picture is displayed as as setting picture. A left end (R) or a right end (R) is selected according to the function key. After any one of L and R has been selected, monitor lamp 63 of encoder 61 is lit up, and the output signals from encoder 61 come into an effective state. That is, one selected end display values of end position data displayed on the setting picture of display 6 are successively sequentially indicated within a range of 0 to 100% in connection with the rotation of rotary encoder 61 by rotating rotary operation unit 62 of encoder 61.

It is feasible to set the desired end position data by stopping the rotation just when indicating the desired position data. In this menu mode also, the end position data are stored in the set condition memory individually assigned for each channel in connection with the rotation of encoder 61. It follows that the pen position also varies with the rotation of encoder 61. After setting the one end position data, the other end position data are likewise set as desired. After the necessary end position data have thus been set, the adjusting of record area in regard to a given selected channel is ended by pushing down entry key 55. For example, 50% is set to the L-side, while 100% is set to the R-side. As a result, the pen recording is effected within a range of 50% to 100%. The left end position of the pen is set to 0% of the chart, while the right end position is set to 100%, thereby virtually compensating for any expansion and contraction of the chart. In the case of adjusting the record area for other channels, the operations subsequent to the channel selecting step are repeated a number of times corresponding to the number of channels desired. When completing the setting of record area, the entry key 55 is pushed down continuously twice. At the time of the second push down of entry key 55, the record area exits the menu mode.

Figure 14:
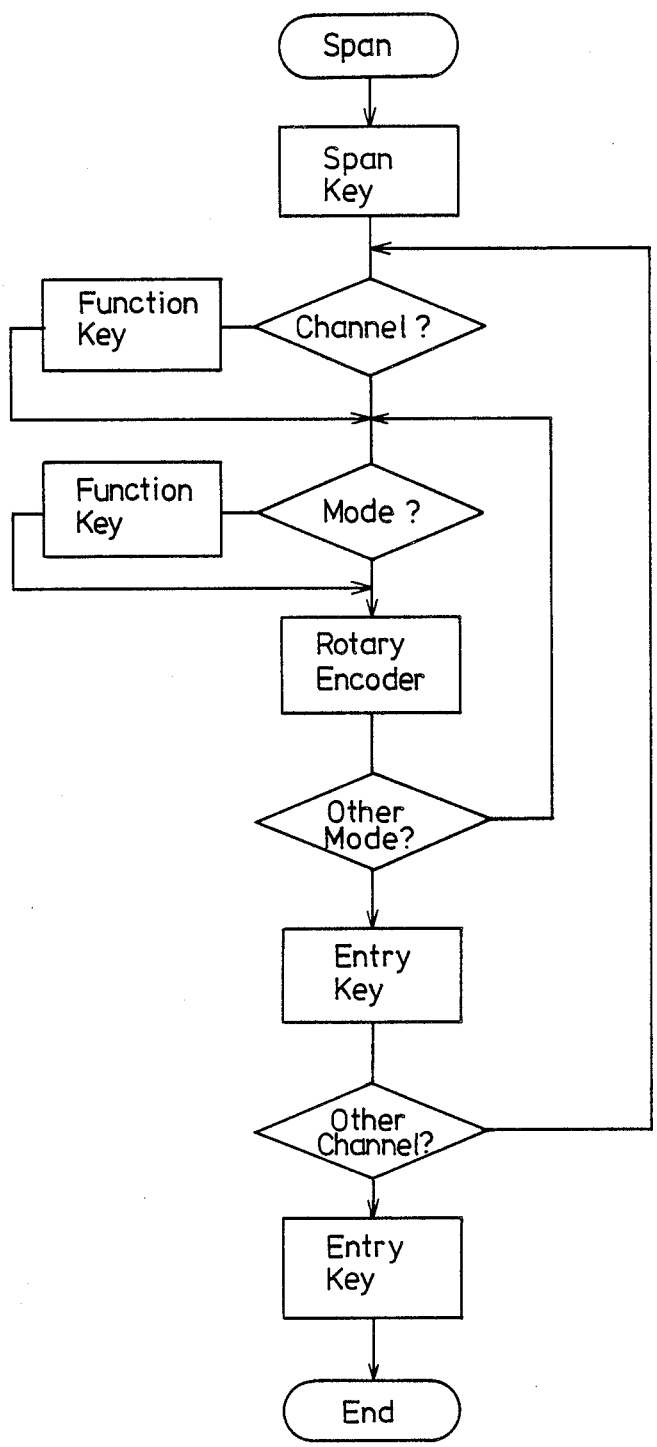

FIG. 14 is a flow chart showing the setting of the span. To begin, span key 52 of key board 7 is pushed down so that the span program which is stored in ROM 13 is executed. The span comes into a settable menu mode, and a span setting picture is indicated on display 6. The first setting picture to be indicated is a channel selecting picture. A desired channel is selected by using the function key. After selecting the channel, a setting object selecting picture is indicated as a setting picture. Subsequently, the left end (L), the right end (R), bilateral ends (L & R) or optimum span search are selected in accordance with the function key. When selecting the optimum scan span search, the optimum span according to the present input signal is automatically selectively set and then displayed.

On the other hand, if anyone of the factors other than the optimum span search is selected, monitor lamp 63 is lit up, and the output signals from encoder 61 are brought into an effective state. More specifically, one selected end display value or two end display values of the end span data displayed on the setting picture of display 6 are successively sequentially varied with the rotation of encoder 61 by rotating the rotary operation unit 62 of encoder 61. Immediately, when indicating the desired span data, the rotation is halted, thus setting the desired end span data.

In this menu mode also, the end span data are stored in the set condition memory individually assigned for each channel as rotary encoder 61 rotates. It follows that the pen position also varies with the rotation of rotary encoder 61. After setting certain data, other span data may be similarly set if desired. When reaching a set value of span, the display value thereof is lit up to attract the operator's attention. The required span data have been set in such a manner, and thereafter the entry key 55 is pushed down, thus completing the setting of span associated with a given selected channel. To set the spans of other channels, the operations subsequent to the channel setting step are repeated a number of times corresponding to the number of channels desired. Where the span setting operations are finished, entry key 55 is pushed down continuously twice. At the time of the second push down of entry key 55, the span exits the menu mode.

As described, it is possible to accuratelt and quickly set the respective set conditions in accordance with the display contents of display 6 while rotating the encoder 61 in much the same way as with a change over switch or variable resistor of a conventional analog type recorder. However, advantageously, with the invention, the set conditions are set using a rotary encoder which from a human engineering standpoint is more accurate, error free and quicker. Also, if necessary, the rotary encoder may be used in combination with a ten-key.

Advantageously, it is also feasible to copy the set conditions of an arbitrary record channel as those of other record channels. In this case, a set condition buffer memory is provided on a bus 18 depicted in FIG. 1, and at the same time set condition copy programs are previously stored in a program table of the ROM 13.

Figure 15:
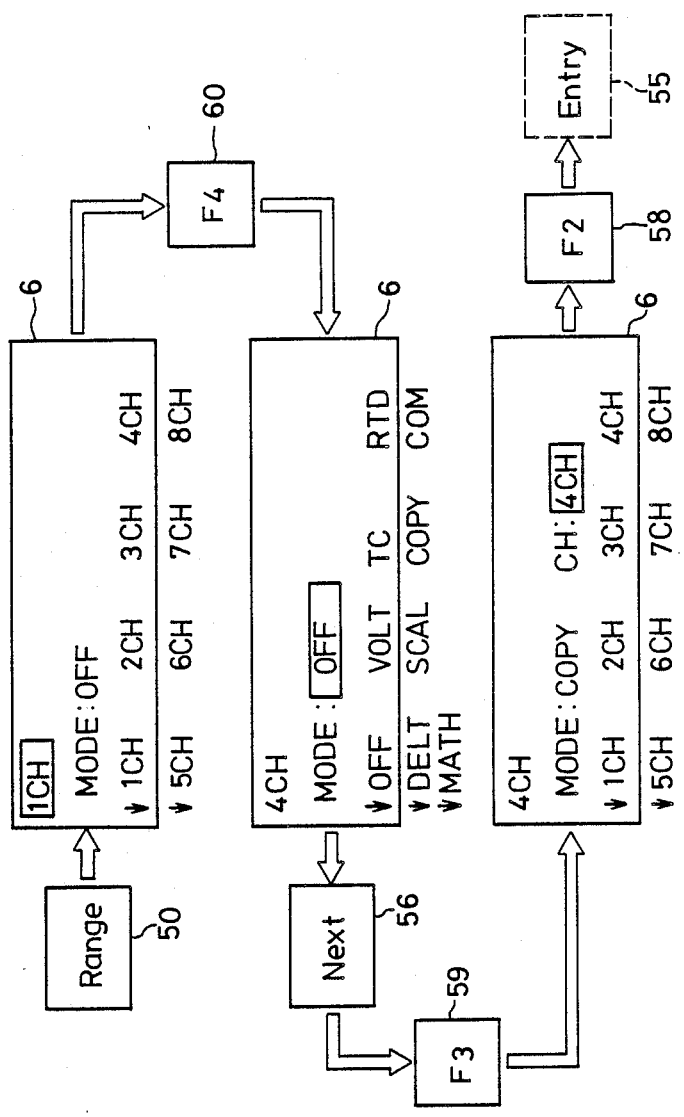
FIG. 15 is an explanatory diagram depicting a set condition copying operation.

FIG. 15 describes set condition copying operations, wherein copying of the range data of the second channel into the fourth channel is used as an example. In this case, an input range key 50 is at first pushed down to effect the setting in a range menu mode. The function key display on the picture of display 6 is brought into channel selection in which the range should be set. The operator pushes down a function key F4 60, because the channel in which to set the range is channel 4 (4CH). Upon pushing down function key (F4) 60, the function key display on the picture of display 6 comes into functional selection in the range menu. "COPY", however, does not appear on the first picture function key display.

Then, the operator pushes down the next key 56 in order to change over the function key display. After pushing down next key 56, the function key display of display 6 changes to the second picture containing "COPY". In the state where the function key display of display 6 becomes the second picture containing "COPY", function key (F3) 59 corresponding to "COPY" is pushed down so that the copy program which is stored in ROM 13 is executed. The function key display on the picture of display 6 is changed over to the channel selection in which the range data to be copied are set. Then, the operator pushes down function key (F2) 58, since the original channel is the second channel. Consequently, the set condition data stored in the set condition memory of the second channel are copied and stored in the set condition memory of the fourth channel through the set condition buffer memory. When executing the measurement under such conditions, that the data are thus copied and stored, entry key 55 is pushed down.

It is possible in the invention to thus copy and set a variety of set conditions, which would otherwise require complex setting processes, by use of simple keying operation. Thus, in the invention, mistakes in setting are avoided.

In the described embodiment, the set conditions are copied by selecting the range as a menu mode. Similarly, the record area and span can be selected and the set conditions thereof can also be copied.

Alternatively, the set condition setting data may be previously stored in an IC (integrated circuit) card memory 32, and the set conditions may be automatically set, as desired.

Moreover, the range search function may be executed as the occasion demands by assigning a range search execution key to one of the soft keys which is manipulated by the operator for the purpose of selectively driving a range search mechanism. Namely, when the power source is inputted, the measurement record is effected in an initial input range set by MCPU 17. After observing the recorded results, the operator judges that the initial input range is inadequate to a magnitude of measured data. Immediately, the operator manipulates the range search execution key assigned to the soft key so that MCPU 17 executes a series of range search operations in conformity with the flow chart of FIG. 16.

Figure 16:
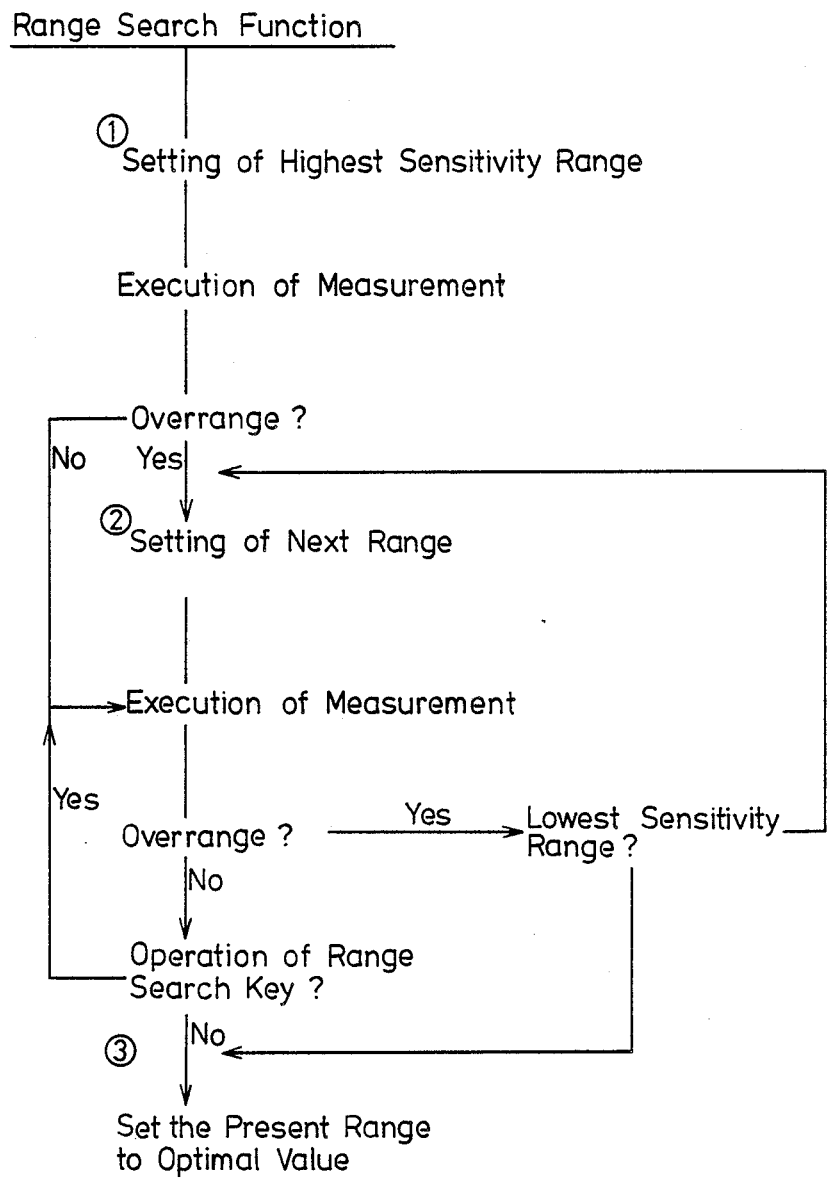
FIG. 16 is a flow chart depicting a range search operation.

Turning to FIG. 16, MCPU 17 at first sets the highest sensitivity range for A/D converter 3 and effects measurement recording step (Step 1). If there is an over range in this state, the sensitivity is reset to a range higher by one stage than the previous one, and the measurement is resumed. The sensitivity is decreased stepwisely down to a range such as to create no over range for the measured data. Then, the measurement recording is carried out (Step 2). If an over range is produced in the case of the lowest sensitivity range, the lowest sensitivity range is conceived as the optimum input range.

On the other hand, also, in such an input range so as to cause no over range, the execution of range search continues while the range search execution key is being manipulated. When the over range is detected, a change over to the next low sensitivity range is effected. If the operator judges from the recorded results that the input range during the measurement recording is adequate, the operation of the range search execution key is released, at which time the input range proves to be optimal. Then, the range search operations are finished. (Step 3).

Turning next to FIG. 17, there is depicted an example of measurement recording wherein the measurement recording is effected by operating the range search execution key until a peak of sine waveform, whose value is unknown, is detected from the recorded results. In FIG. 17, the numerals 1,2 and 3 individually correspond to steps 1,2 and 3 in the flow chart of FIG. 16.

In FIGS. 16 and 17, a process is illustrated wherein the range search operations continue for a given period by continuously operating the range search execution key for a predetermined period. If there is no necessity for the continuation of range search operations, the range search operations may be initiated simply by operating the range search execution key once.

FIGS. 18(A) and 18(B) depict measurement recordings when the range search operations are not continued, with FIG. 18(A) depicting a recording where the over range recording is obviated with the range search operations being initiated by operating the range search execution key once at an arbitrary time P during the over range recording. FIG. 18(B) shows a measurement recording where the input range is set to a value optimal to small amplitude recording with the range search operations initiated by operating the range search execution key once at an arbitrary time T during the small amplitude recording. To be more specific, when measuring and recording a waveform of an extremely low frequency, a waveform which has undergone the over range due to abnormality or is likely to undergo it and a waveform, the amplitude of which is gradually attenuated at an abritrary timing within an adequate input range, the optimum input range is automatically set simply by operating the range search execution key once.

The control under which the range search operations are initiated is not confined to use of the execution key of the key board. For example there may be used a mechanical switch having a contact point switch, a logical switch which makes use of memory information settable by a toggle in accordance with a communication command or a menu setting command, or a time limit switch for outputting a signal internally equivalent to the operation of execution key for a time set by the operator.

Figure 19:
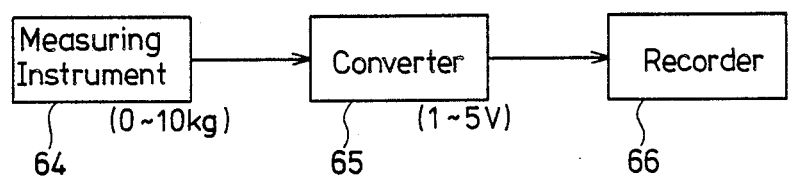
FIG. 19 is a block diagram depicting a state when the recorder is used.

In FIG. 19, a measuring instrument 64 is shown which is capable of measuring a physical quantity, e.g. 0 to 10 Kg, and outputting signals representing such quantities measured. The measurement signals from measuring instrument 64 are transmitted to converter 65, where measurement detecting signals of 0 to 10 Kg are converted into voltage signals of, e.g. 1 to 5 V. Conversion output signals of converter 65 are applied to a recorder 66, wherein the magnitudes of the output signals are analog recorded on a chart.

Figure 20:
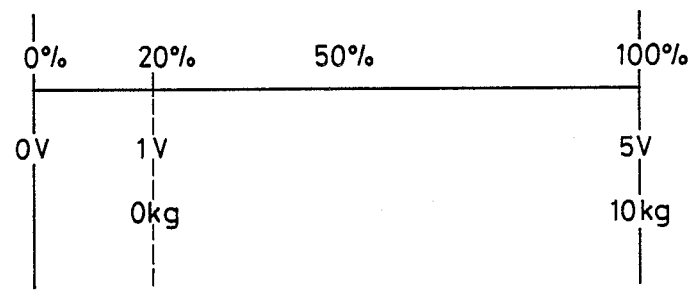
FIGS. 20, 21, 22, and 23 are explanatory diagrams showing the areas.
Figure 21:
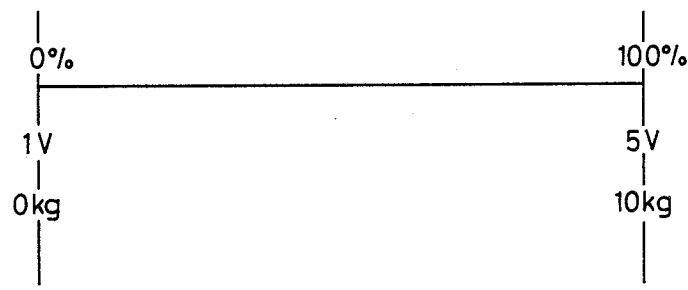

According to the recording mode of recorder 66, as illustrated in FIG. 20, the input range is set to, e.g. 5 V, that is with 0% of the chart set to 0 V, while 100% is set to 5 V. In such a manner of setting, 0 Kg of the measured physical quantity usually corresponds to 20% of the chart. Consequently, it is hard for the operator to read at a glance the magnitude of the physical quantity from the measured results. That is for the human mind zero is always associated with an initial starting point such as the extreme left, for an American, of a sheet of paper. Zero is usually not associated with a point which is 20% of the distance from the left to the right. To cope with this, for example, as illustrated in FIG. 21, it is preferred that 0% of the chart be set to 1 V, while 100% be set to 5 V. Using this method of setting, 0 Kg of the measured physical quantity then corresponds to 0% of the chart, while 10 Kg corresponds to 100% of the chart. It is thus possible for the human operator to read and understand at a glance the magnitude of measured physical quantity from the recorded results.

Figure 22:
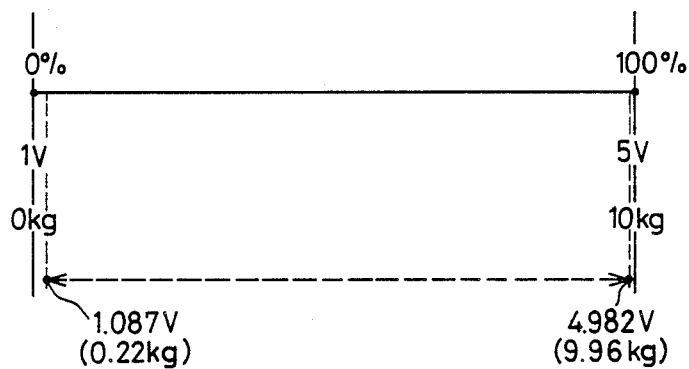

In FIG. 19, supposing that a conversion voltage when measuring 0 Kg is 1.087 V and another conversion voltage when measuring 10 Kg is 4.982 V because of an error in the converter 15, then the conversion outputs in this state are recorded by the recorder set in a way depicte in FIG. 21. As shown in FIG. 22, 1.087 V of conversion voltage at 0 Kg measuring time is recorded on the chart, and 4.982 V of coversion voltage at 100 Kg measuring time is recorded thereon as it is. Namely, the above recorded results on the chart contain some errors, so that it is impossible to read an accurate value of measured physical quantity from the recorded results.

Figure 23:
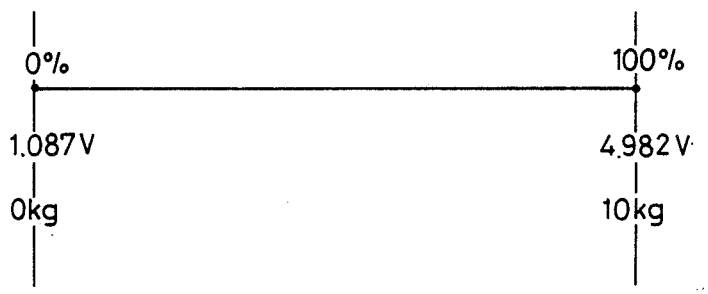

This kind of error, however, can be eliminated as illustrated in FIG. 23, by setting 0% of the chart to 1.087 V and 100% to 4.982 V. In the prior art, where the above span setting is performed, the operator reads the output voltage of 1.087 V of converter 65 at 0 Kg measuring time from display 6, and manipulates the ten-key provided on key board 7 so that "1.087" is stored as span left data in the span memory area which corresponds to 0% of the chart. Similarly, "4.982" is stored as the span right data in the span memory area which corresponds to 100% of the chart by operating the ten-key of key board 7 after reading the output voltage of 4.982 V from converter 15 at the 10 Kg measuring time.

In the above conventional arrangement, however, the adjusting of the record area involves such steps that the operator reads the display data on the display and inputs the read value by operating the ten-key of the key board. Hence, the operator has to perform complicated operations, and there will inevitably occur various mistakes in the input.

The defects caused by such conventional manual setting are eliminated by the invention in the following manner. There is provided a buffer memory for temporarily storing the measured data corresponding to both ends of the record area. Selective operation is then effected so that the measured data stored in the buffer memory are respectively transferred and stored in the span memory area corresponding to 0% of the chart and in another span memory area corresponding to 100% of the chart.

Figure 24:
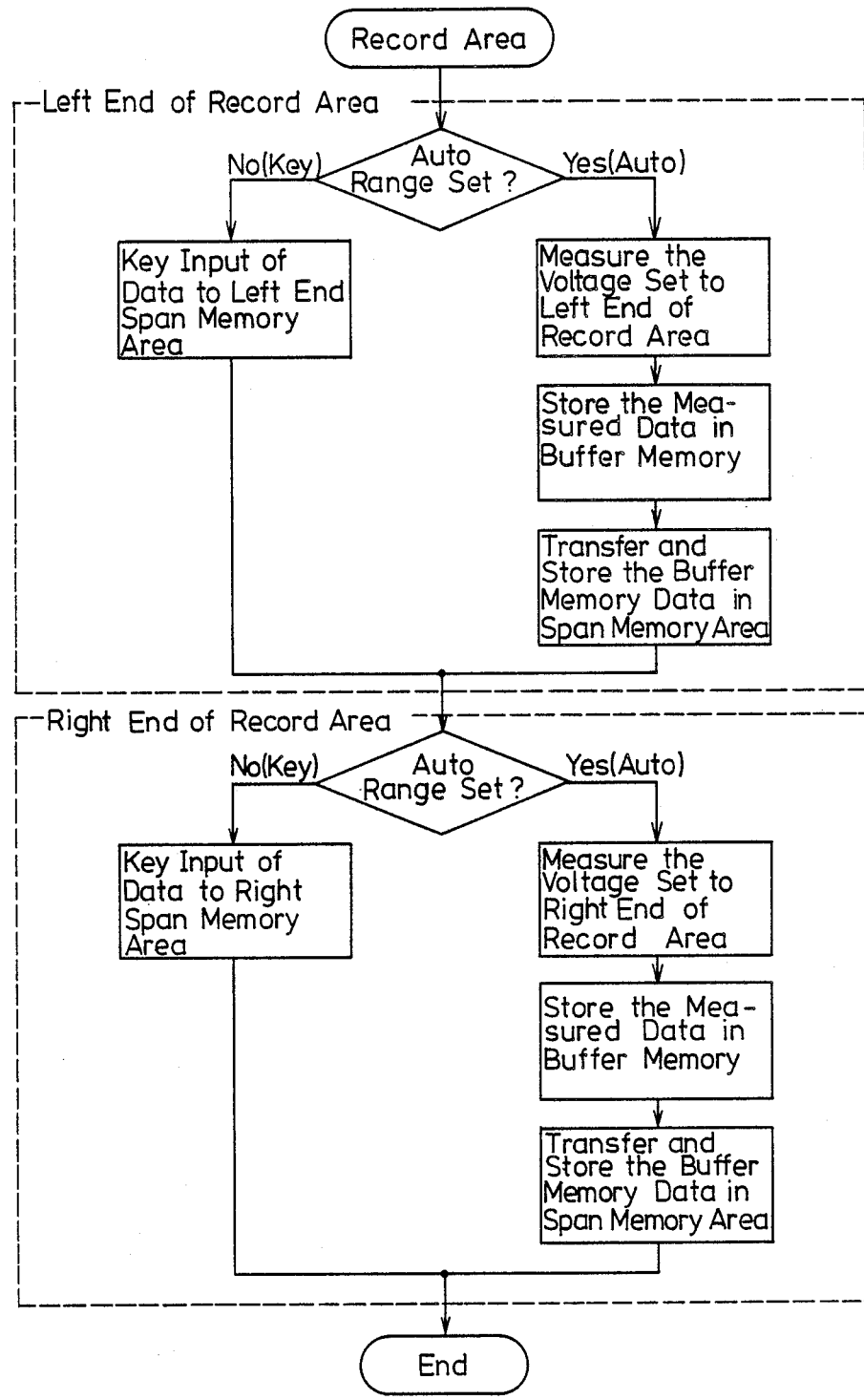
FIG. 24 is a flow chart depicting the operations involved in adjusting the record area of the recorder.

The flow chart of FIG. 24 shows the operations for adjusting the record area in the recorder to overcome the just discussed defects. For setting the data of the left end of the record area, the inital step is to judge whether auto range setting should be selected or not. If not, as in the previous case, the operator manipulates the ten-key of key board 7 in order to store the desired data in the left span memory area. If the auto range setting is selected, the measurement is carried out by impressing a voltage on input terminal 1 (e.g. output voltage of converter 65 at 0 Kg measuring time) which is to be set at the left end of the record area. Then, the measured data are temporarily stored in the buffer memory. Thereafter, the data stored in the buffer memory are transferred and stored in the left span memory area.

For setting the right end data of the record area, the initial step is similarly to judge whether the auto range setting should be selected or not. If not, as in the span left end setting, the operator manipulates the ten-key of key board 7, and the desired data are thereby stored in the right span memory area. If the auto range setting is selected, the measurement is effected by impressing a voltage on input terminal 1 (e.g. output voltage of the converter 65 at 10 Kg measuring time), which is to be set at the right end of the record area. Then, the measured data are temporarily stored in the buffer memory. Subsequently, the data stored in the buffer memory are transferred and stored in the right span memory area.

In this way, the record area is automatically set, which eliminates the necessity for data inputting based on the ten-key operation of the operator. Also, the record area can be adjusted accurately and quickly with the invention. The recorded results, after the automatic setting has been performed, becomes identical with those described in FIG. 23. Even if there are some errors in converter 65, as far as the rectilinearity of converter 65 can be maintained, the precise recorded results can be maintained, the precise recorded results can be obtained without recalibrating the converter.

Figure 25:
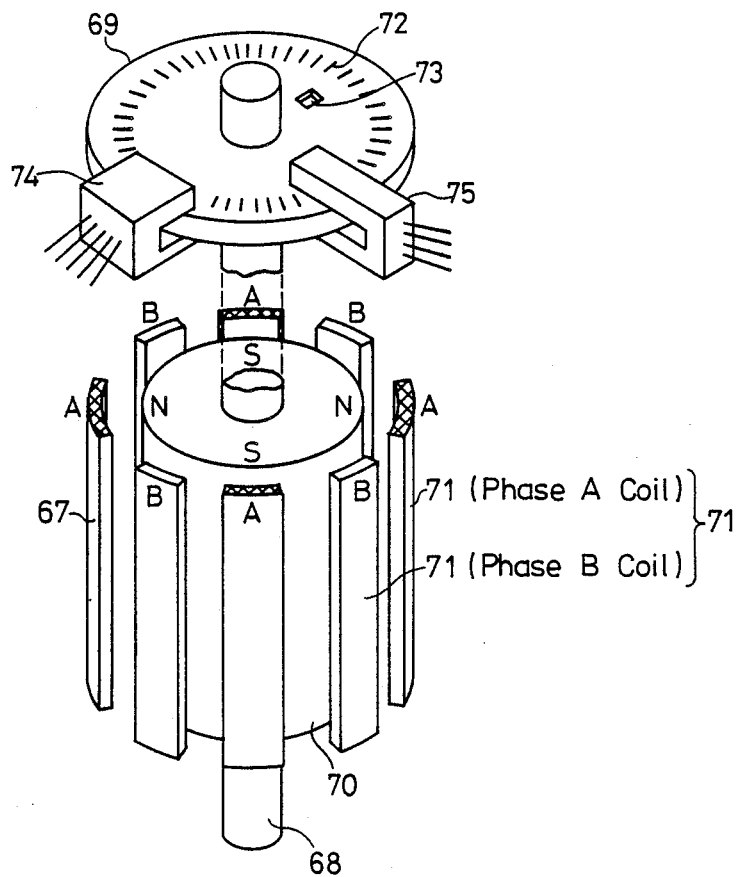
FIG. 25 is a pictorial view depicting principal portions of a servo controller.

Servo controller 9 of FIG. 1 is constructed so that, e.g. as illustrated in FIG. 25, an optical code plate 69, serving as a position detecting element of a brushless motor 67, is fitted to a shaft 68 of brushless motor 67. Motor 67 comprises a rotor 70 consisting of a permanent magneti whose outer peripheral surface is magnetized into four poles, and several pairs of armature coils 71 each consisting of an A-phase coil and a B-phase coil which impart a rotary magnetic field to rotor 70. Armature coils 71 are disposed around mrotor 70 so as to make an electrical angle of 90°. Optical code plate 69 is shaped in a disk like configuration and is formed with a plurality of slits 72 provided at equal spacings in the vicinity of the outer periphery thereof. Optical code plate 69 also includes a hole 73 for indicating a reference position for confirming the positions of magnetic poles. A slit sensor 74 is provided for outputting 2-phase signals which are 90° out of phase by optically detecting slits 72. A hole sensor 75 optically detects hole 73.

The rotating direction and the rotational angle of rotor 70 can be detected by the output signals transmitted from slit sensor 74, while the reference position for rotor 70 can be detected by the output signals from hole sensor 75, thereby obtaining positive feedback information suitable for digital servo system use. Pieces of position feedback information are imparted to SUB CPU 11, and a pulse width signal whose duty varies at a sine function and a cosine function in accordance with the positions of the magnetic poles of rotor 70 are thereby created. The pulse width signals serve to drive and excite the armature coils 71 so that the terms of sine and cosine disappear. As a result, the brushless motor has a constant torque irrespective of the rotary angle of the rotor 70.

Figure 26:
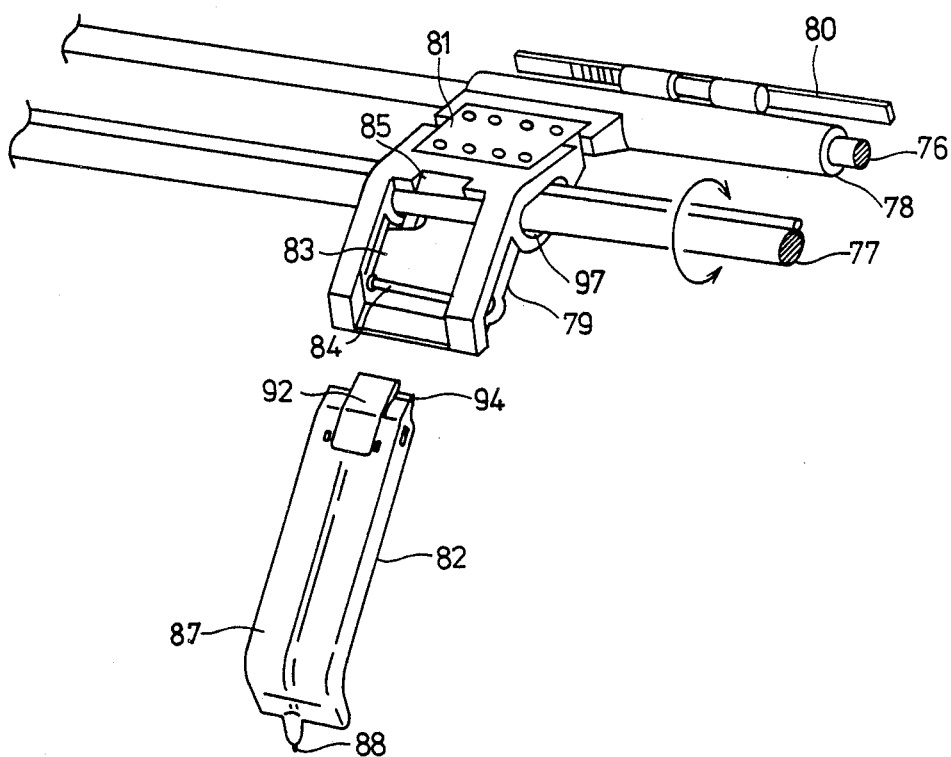
FIG. 26 is a pictorial view depicting a pen mechanism.

FIG. 26 describes a pen mechanism comprising a first guide shaft 76 having a circular configuration in section; a sectionally goard shaped guide shaft 77 having a large diameter portion and a small diameter portion which are connectively formed of different materials each having a non-circular shape. A carriage 78 is movably fitted to first guide shaft 76. A pen holder 79 is movably fitted to second guide shaft 77. Note that second guide shaft 77 is selectively driven to rotate in reciprocating directions by an unillustrated rotating mechanism. A timing belt 80 is provided for moving carriage 78 along first guide shaft 76, timing belt 80 being reciprocally driven by an unillustrated DC brushless motor. A connecting member 81 connects carriage 78 to pen holder 79. A pen 82 is attachable to and detachable from pen holder 79.

Pen holder 79, has both side surfaces thereof formed with insertion holes 97 into which guide shaft 77 is loosely fitted. A plane surface is partially formed with an opening 83 for fitting the end portion of pen 82. A latch shaft 84 is fitted in parallel with guide shaft 77 into opening 83. Both ends of latch shaft 84 are formed integrally with flanges, each having a taper, for regulating the position in which pen 82 is installed, and are at the same time supported on pivot bearings so as to rotate slightly. The plane is partially formed with a notch 85 into which a part of pen 82 is fitted.

Turning now to FIGS. 27, 28, 29, pen 82 comprises an ink case 87 accomodating an inner ink holder, such as cotton, 86 into which the ink permeates, ink case 87 being formed flat and having its one end crooked as depicted; a pen tip 88 so fitted as to communicate with the interior of the crooked end portion of ink case 87; an installing portion 89 formed integrally with the other end of the ink case 87 so as to fit into opening 83 of pen holder 79; a pen pressure generating plate 92 rotatably attached through a shaft 90 to a part of the surface of installing portion 89 so that one end of plate 92 presses notch 85 formed in a part of pen holder 79 and the other end thereof is biased by a pen pressure spring 91; an engaging portion 93 provided on the underside of installing portion 89 so as to engage with latch shaft 84 attachably, detachably and rotatably, which is mounted on pen holder 79; and a positioning member 94 provided on the underside of installing portion 89 so as to stand vis-a-vis with respect to the lower surface of guide shaft 77 while being mounted on pen holder 79.

In this embodiment, when mounting pen 82 on pen holder 79, installing portion 89 of pen 82 is fitted into opening 83 of pen holder 79. Subsequent to this step, positioning member 94, provided on the underside of installing portion 89, is inserted so as to face the lower surface of guide shaft 77. Then, engaging portion 93 engages with latch shaft 84.

Figure 30:
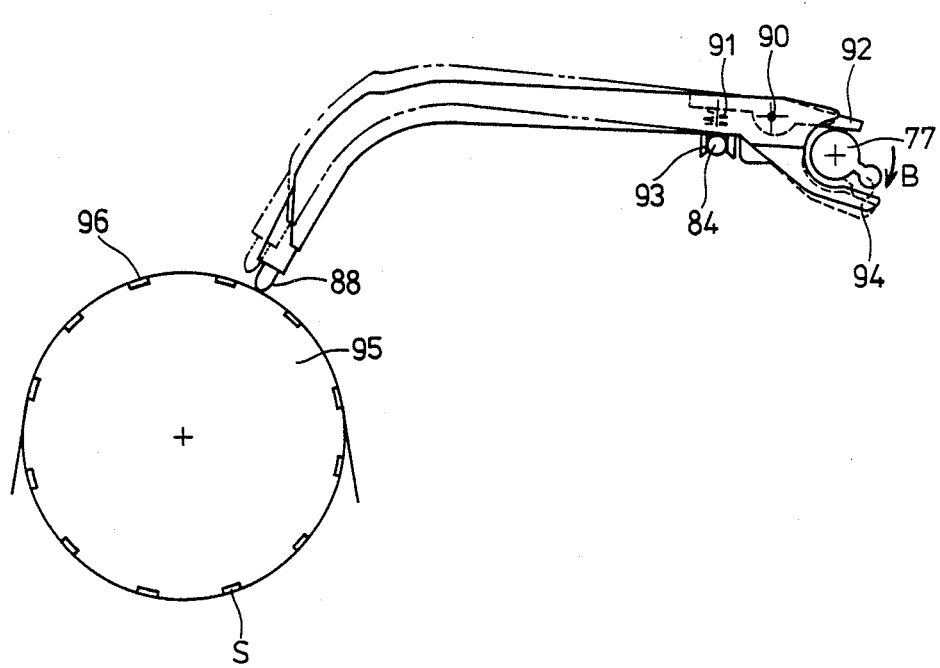
FIG. 30 is a view depicting operation of the pen mechanism.

FIG. 30 shows pen 82 mounted on pen holder 79, wherein the solid line depicts a recording position or state where pen 82 takes a downward posture, while the two dotted chain line depicts a non-recording position or state where pen 82 takes an upward posture. A chart 96 is wound partially on plate roller 95. The surface of platen 95 includes a plurality of slits S formed so as to cyclically coincide with creases of the chart 96 in order to reduce the amount of ink leaking from the creases when using a folded type chart. These slits S are effective in preventing the chart 96 from being blurred with ink even when being formed in an unrotatable tabular platen.

In the recording position or state, positioning member 94 is mechanically free from guide shaft 77. Pen 82 is pushed and rotated about latch shaft 84 towards platen roller 95 by means of self-weight and pen pressure generated between notch 85 of pen holder 79 and pen pressure generating plate 92 biased by pen pressure spring 91. Pen tip 88 is brought into a pen-down state (i.e. touching position) where tip 88 comes into contact with chart 96 on platen 95 by a given pressing force with stability.

In the non-recording position or state, guide shaft 77 is rotated in the direction shown by arrow B, and the end portion of positioning member 94 is pressed by the small diameter portion of guide shaft 77. Pen 82 is rotated clockwise about latch shaft 84, while resisting the pressing force, acting towards platen roller 95, into which the self-weight and the pen pressure are combined. As a result, pen tip 88 comes into the pen-up state (i.e. non-touching position) where tip 88 is separated from contact with chart 96.

Guide shaft 77 has a gourd-like shape in section. The configuration is not, however, limited to such shape. Other non-circular and circular shapes in section may be used, provided that such shapes will carry out the assigned function of such guide shaft.

Figure 31:
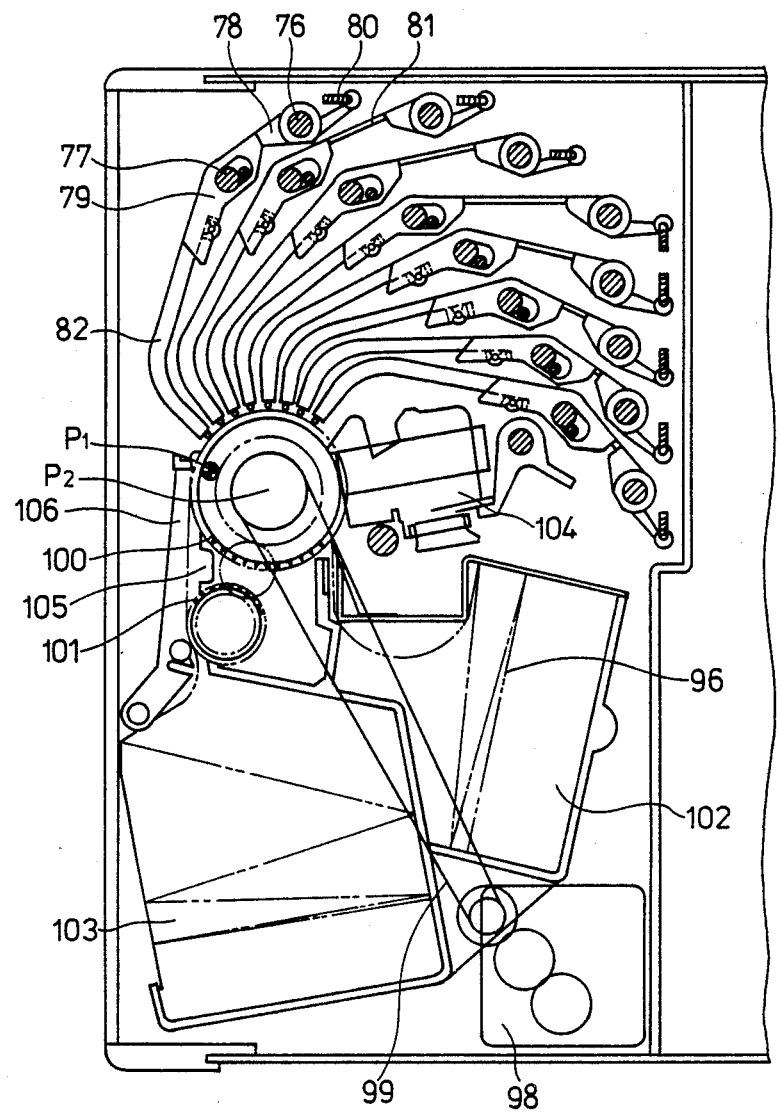
FIG. 31 is a partial sectional view depicting components of a multipen recorder.

FIG. 31 shows a multipen recorder in which 8 pens are used, wherein a platen rotational driving mechanism 98 is provided for rotationally driving sprocket wheels 100 and 101 with the aid of a timing belt 99. Sprocket wheels 100 and 101 are mounted so as to be bilaterally movable in accordance with expansion and contraction of chart 96. A first accomodation unit 102 is provided for holding unused charts. A second accomodation unit 103 is provided for holding recorded or used charts. These units 102 and 103 and a chart feed including the sprocket wheels 100 and 101 are combined into one unit body as a chart cassette. A thusly combined chart cassette is supported between unillustrated side plates so as to be taken out while rotating about apoint $P_1$. A wire dot head 104 is disposed to move in parallel with the platen within a recording range of the chart 96 so as to effect digital printing. A spacer 105 has a flat surface and is disposed between sprocket wheels 100 and 101. A chart holding member 106 is attached to the chart cassette.

Second guide shafts 77 of the respective pen mechanims are disposed at equi-angular spacings on the periphery around a rotary shaft $P_2$ of platen roller 95. First guide shafts 76 are disposed on other than the periphery around the rotary shaft of the platen 95 such as in other suitable positions, taking into consideration the space for accomodating the unillustrated DC brushless motor by which the respective pen mechanisms are driven.

With the FIG. 31 embodiment, it is possible for all of the components, excluding connecting member 81, which constitute the individual pens to assume the same configuration and be interchangeable. First guide shafts 76 can be disposed other than on the periphery around the rotary shaft of platen roller 95 such as in any suitable position by varying only the configuration of connecting member 81. In addition, the unillustrated brushless motors for driving the respective pen mechanisms can be arranged in optimum positions to minimize the size of the system as a whole.

Figure 32:
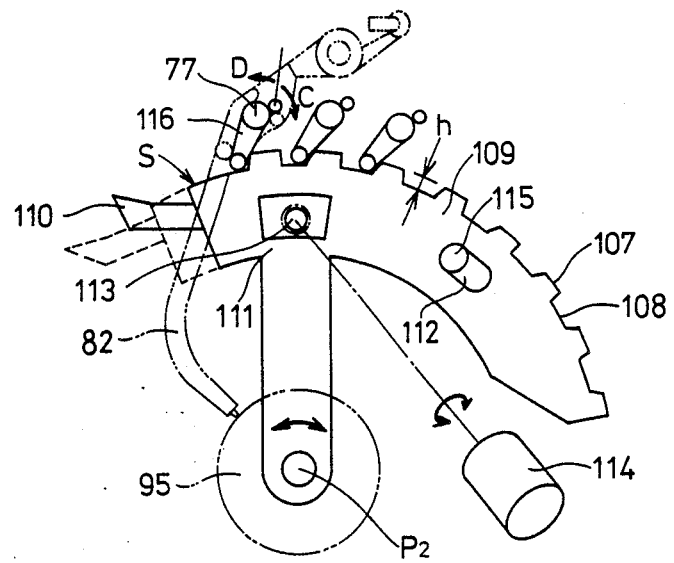
FIGS. 32 and 33 are pictorial views depicting a mechanism for raising and lower the pen.

FIG. 32 describes a pen mechanism in a multipen recorder for moving the pens into and out of contact with the chart, otherwise often known in the art as the pen-up and pen-down positions. For convenience, only one pen mechanism is described, wherein a fan shaped cam 107 is rotatably installed so as to be coaxial with rotary shaft $P_2$ of platen roller 95. The outer periphery of cam 107 is formed with a plurality of grooves 108 provided at equi-angular spacings so as to correspond to the positions in which second guide shafts 77 are disposed, and with projections 109 each having a taper formed on one surface and a height h. One end of cam 107 is provided integrally with a protruded portion 110 used for manual operation. Formed in the side surface of cam 107 are first opening 111 provided with a gear and a second opening 112 for regulating the rotational position. A gear 113 meshes with another gear provided in first opening 111, gear 113 being rotationally driven in reciprocating directions by means of a stepping motor 114. A stopper pin 115 is fitted into second opening 112. A lever 116 has one end thereof fixed to the end portion of second guide shaft 77 and another end thereof assuming a circular arc configuration and fitted in groove 108 of cam 107.

In the recording position, the end of lever 116 is positioned in groove 108 of cam 107, and second shaft 77 is rotated in the direction indicated by arrow D. Positioning member 94 for pen 82 is, as in the state drawn with the solid line of FIG. 30, mechanically free from guide shaft 77. Namely, pen 82 is brought into the pen-down state (i.e. touching position).

On the other hand, the end portion of level 116 slides on the tapered surface of projection 109 by rotating cam 107 counterclockwise, and guide shaft 77 is rotationally driven in the direction indicated by arrow C. Subsequently, the small diameter part of guide shaft 77, as in the state shown by the two-dotted chain line of FIG. 30, presses the end positioning member 94. Thus, pen 82 is brought into the pen-up state (i.e. non-touching position). The maximum amount of clearance between the chart and the pen tip is determined by the position in which lever 116 reaches the vertex of projection 109 of cam 107, i.e., by the height h of projection 109.

Thus, all of the pens can simultaneously be moved up and down by rotating cam 107. As discussed above, the rotational driving of cam 107 may be effected electrically by stepping motor 114 or alternatively by manual operation. Where the cam is rotationally driven by stepping motor 114, the time required for the pen-down process can be increased by diminishing the driving pulse frequency, with the result that the pen moves down softly. The impact caused by the pen-down process can thereby be reduced. Accordingly, defacement of the pen tip can be minimized, and noises concomitant with the impact can also be decreased.

Figure 33:
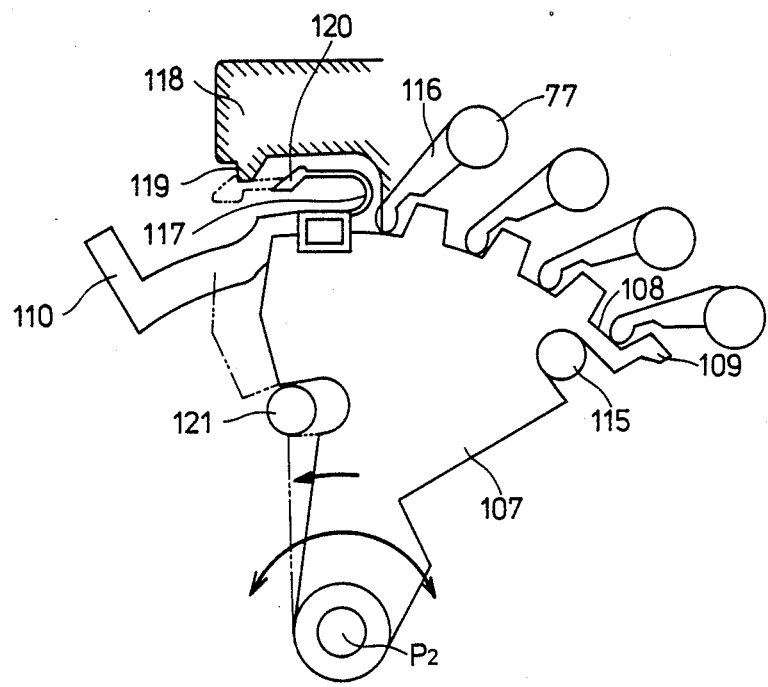
Figure 34:
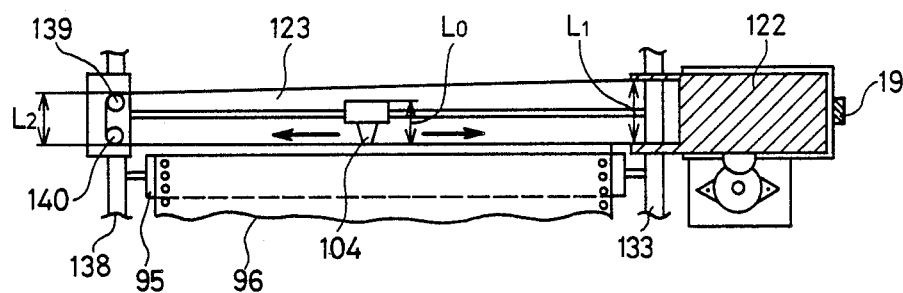
FIG. 34 is a plan view depicting a wire dot head with some portions thereof removed.
Figure 35:
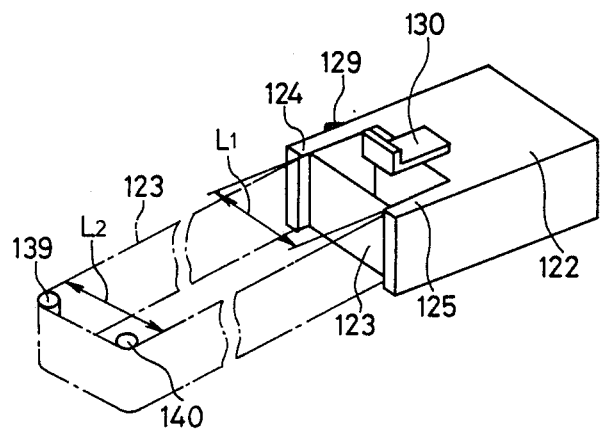
FIG. 35 is a perspective view depicting an example of an ink ribbon cassette.
Figure 36:
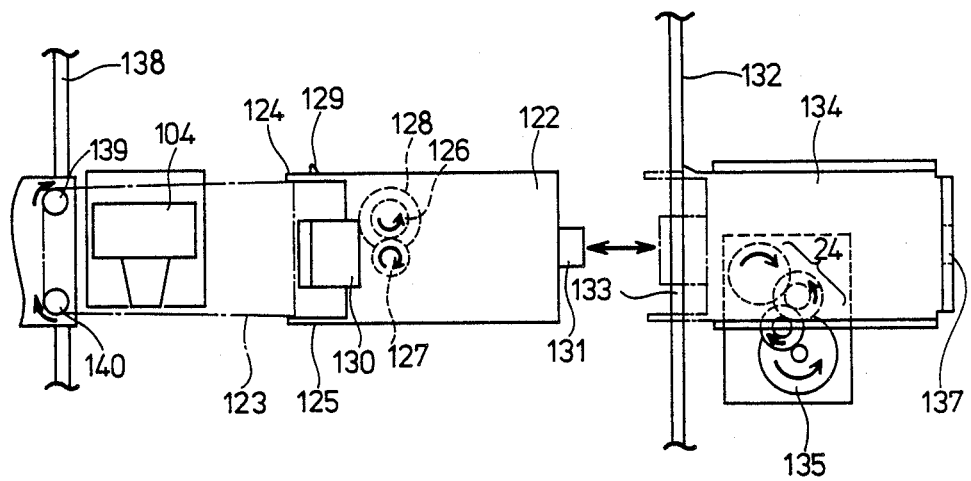
FIG. 36 is a plan view depicting operation of the embodiment.

FIG. 33 describes another embodiment for moving the pens up and down, wherein motor 114 depicted in FIG. 32 is not used. A latch lever 117 is formed integrally with a part of cam 107 while providing elasticity thereto. The end of latch lever 117 is provided with a pawl 120 which attachably and detachably engages with projection 119 formed on side plate 118. A stopper pin 121 regulates the rotational scope of cam 107. The recording state is thus obtained, as depicted by the solid line, wherein the end of lever 116 is positioned in groove 108 of cam 107, thereby to bring about the pen-down state.

On the other hand, as indicated by the two dotted chain line, cam 107 is rotated counterclockwise so as to pull out projection 110 of cam 107 so that the end of lever 116 slides on the tapered suffuse of projection 109. In this state, pawl 120 of latch lever 117 engages with the protruded portion 119 formed on the side plate 118 to prohibit the clockwise rotation of cam 107 so as to maintain the pen-up state. When changing from the pen-up state to the pen-down state, the projection of cam 107 is intruded to release the engagement between protruded portion 119 and pawl 120. The rotation of cam 107 continues until cam 107 impinges upon stopper pin 115. In the course of this process, lever 116 slides on the tapered surface of projection 109, and the pen moves down softly.

All of the pens can be simultaneously moved up and down, as in the case of FIG. 32, by rotating cam 107 in combination with the thus operated protruded portion 110.

The dot head and ribbon mechanism will be explained next with reference to FIGS. 34–38, wherein ink ribbon cassette 122 is provided for holding ink ribbon 123 with cassette 122 having the shape of a substantially rectangular prism. Provided on both sides of one end of ink ribbon cassette 122 are arms 124 and 125 each having a passage port for ink ribbon 123 at an interval $L_1$ which is larger than the depthwise length $L_0$ of wire dot head 104. The bottom surface of ink ribbon cassette 122 is provided with a gear 128 for imparting rotary forces to ink ribbon take up rollers 126 and 127 which are incorporated thereinto. The side surface of arm 124 is formed with stopper pawl 129, the upper surface of one end thereof being provided integrally with an L-shaped positioning member 130, and the bottom surface of the other end thereof being provided integrally with a wedge like positioning member 131.

A right side plate 132 is attached to the recorder body. Side plate 132 is formed with a window 133 into which the other end of cassette 122 is inserted so as to be positioned on the extension of the line with respect to the moving range of wire dot head 104. A bracket 134 is disposed outwardly of window 133, for supporting the end portion of cassette 122. Mounted on the bottom surface of bracket 134 is a rotational driving mechanism comprising a gear train 136 and a motor 135 for rotationally driving rollers 126 and 127 of cassette 122. The rear surface of the lower portion of bracket 134 is bored with an engagement hole 137 into which positioning member 131, provided on the bottom surface of cassette 122, is inserted.

Figure 37:
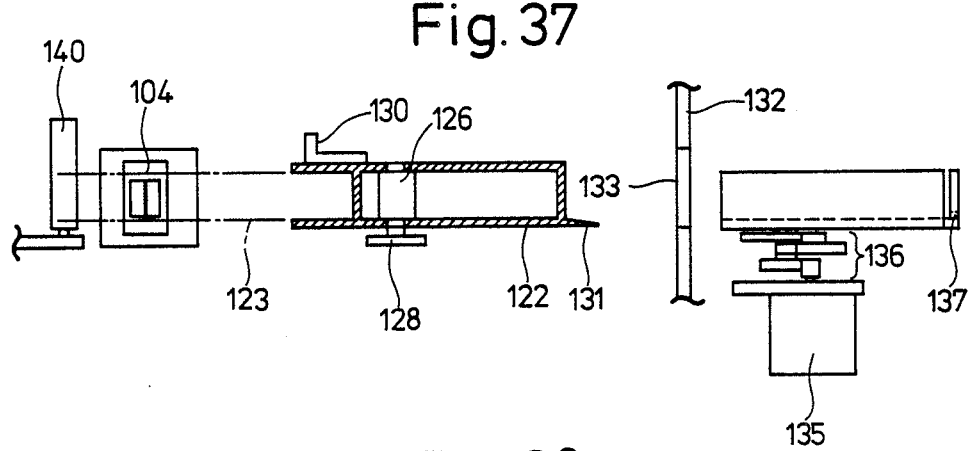
FIG. 37 is a partial sectional view of FIG. 36.

A left side plate 138 is attached to the recorder body. Side plate 138 is fitted with guide rollers 139 and 140 at an interval $L_2$ which is smaller than intervals $L_1$, between arms 124 and 125 of cassette 122 so as to be positioned on the extension of the line with respect to the moving range of wire dot heat 104. These guide rollers 139 and 140, are, as shown in FIG. 37, placed higher than wire dot head 104.

Figure 38:
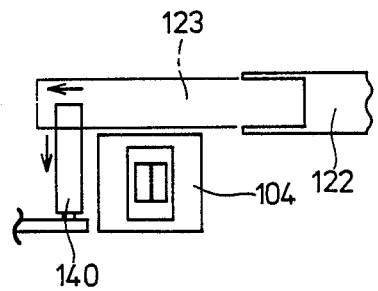
FIG. 38 is a view depicting loading of the ink ribbon.

According to the embodiment, when loading cassette 122 into the recorder, the ribbon, exposed between arms 124 and 125 of cassette 122, is set around guide rollers 139 and 140. Subsequently, as depicted in FIG. 38, ink ribbon 123 slides downwards along guide rollers 139 and 140. After this step, cassette 122 is moved towards right side plate 132, and the end thereof is inserted into window 133 while pulling out ink ribbon 123. The end portion, inserted into window 133 of cassette 122, is fitted in bracket 134. Then, positioning member 131, which is provided on the bottom surface of cassette 122, is inserted into enagagement hole 137 formed in bracket 134. Both side surfaces of side plate 132 are seized by pawl 129 fo arm 124 and by L-shaped positioning member 130 which is provided on the upper surface, thus fixing cassette 122 to bracket 134. This fixation permits gear train 136 of the rotational driving mechanism to mesh with gear 128 coaxially fixed to roller 126 of cassette 122 , and ink ribbon 123 is thereby fed out with the rotation of the rotational driving mechanism.

When replacing the cassette 122, arms 124 and 125 protruding from side plate 132 are made to deviate inwards, thereby releasing engagement between pawl 129 and window 133. Cassette 122 is then dismounted from bracket 134.

In the above embodiment, cassette 122 can be loaded or replaced simply by use of a single hand. Cassette 122 is not loaded on the carriage of wire dot head 104. Hence, the carriage can be miniaturized Thus, also, the load on the driving mechanism of the carriage is reduced.

In the above embodiment, there is depicted one side plate mounted with guide rollers, another side plate bored with a hole into which the end of the cassette is inserted, and a bracket is provided outwardly of the side plates. If there is space in the recorder body, the guide rollers and the bracket may be incorporated into the space formed inwardly of the two side plates. Also, instead of providing two guide rollers, there may be formed a guide having a width equivalent to the spacing between the guide rollers.

Figure 39:
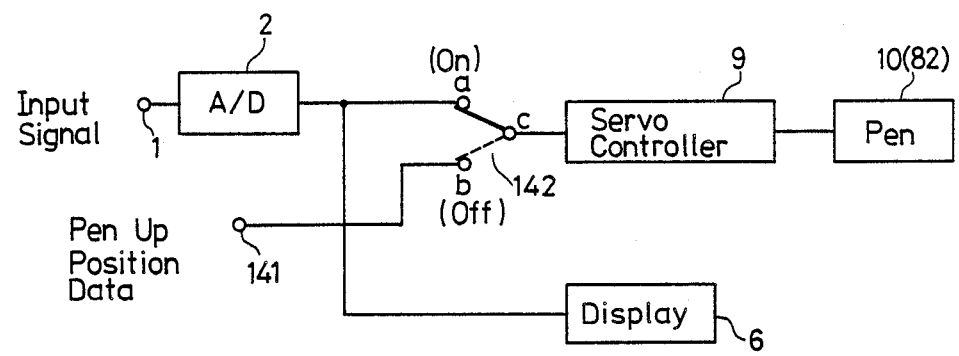
FIG. 39 is a circuit diagram depicting movement of the pen up and down.
Figure 40:
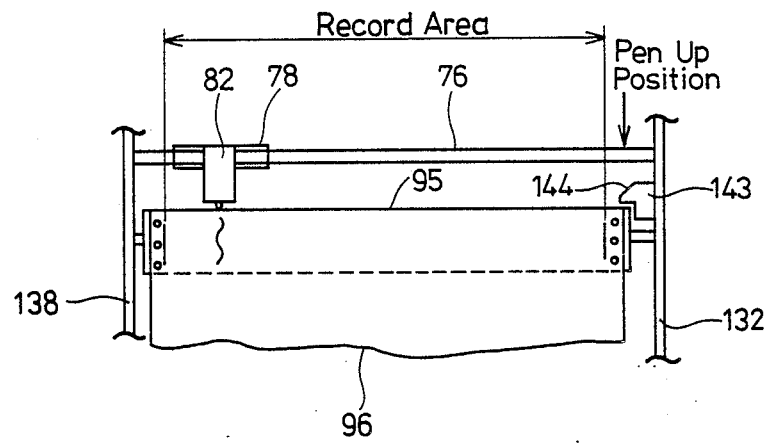
FIG. 40 is a view depicting the mechanical construction of the embodiment.
Figure 41:
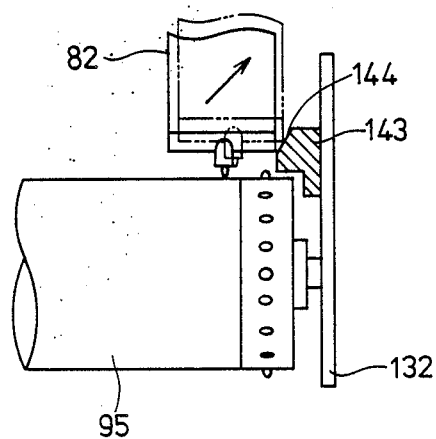
FIG. 41 is an enlarged diagram depicting the principal portions of FIG. 40.

The operation of the pen moving mechanism is further discussed with reference to FIGS. 39, 40 and 41, wherein an input terminal 141 is provided for pen-up position data, to which digital signals are inputted. An ON and OFF switch 141 is provided for the recording operations. One fixed contact point a of switch 142 is connected to the output terminal of A/D converter 2, while the other fixed contact point b thereof is connected to input terminal 141 for the pen-up position data. A movable contact point c is connected to the input terminal of servo controller 9 for moving pen 10(82). Display 6 is connected to the fixed contact point a of change over switch 142. A pen-up block 143 is placed on side plate 132 which is positioned outside a record area E. The pen-up block 143 is formed with an inclined surface 144 on which pen 82, moving in accordance with the pen-up position data, runs. Change over switch 142 may be a mechanical switch or a switch operated by software As the pen-up position data, position data corresponding to a pen-up position F is added.

In the normal recording state, the movable contact point c of change over switch 142 is connected to fixed contact point a. At this time, pen 82 is in the so-called pen-down state where the pen tip is in contact with chart 96 on platen roller 95 by action of the predetermined pen pressure. Pen 82 is moved to a position corresponding to a value of measured signal by means of the servo controller. The values of measured signals are consecutively recorded on chart 96. The values of measured signals can also be read from the indication on display 6.

In the case of moving up pen 82, the movable contact point c of change over switch 142 is connected to fixed contact point b so that pen 82 is moved at a high velocity to position F corresponding to a value of pen-up position data by means of the servo controller. Pen-up block 143 is, as described above, formed with inclined surface 144 on which pen 82, reaching a predetermined position, runs. Hence, as indicated by the two dotted chain line of FIG. 41, pen 82 runs on the inclined surface 144 while rotating in cooperation with carriage 78, thereby separating pen tip from chart 96. As in the pen-down state, the values of measured signals in the pen-up state can be read from the indications on display 6. The measuring operations are not hindered at all by the pen-up process.

Advantageously, pen 82 can selectively be moved up and down in combination with the crosswise movement of carriage 78 with respect to the chart by changing over change over switch 142 as desired. As a result, any independent power source such as a motor or a solenoid for moving up the pen is not necessary. This reduces cost. In the pen-up state, pen 82 remains static on pen-up block 143, and the dynamic friction between carriage 78 and guide shaft 76 can thus be reduced. Also, this facilitates replacement of pens 82. Because pen-up block 143 is shaped to stand vis-a-vis with a part of the outer periphery of the sprocket wheel wound with chart 96, pen-up block 143 performs the function of a chart holder. Where change over switch 142 involves a switch controlled by software, it is possible to control the change over switch by outside control signals without adding any special parts even when the recorder body is controlled by a general purpose communication bus or outside contact point signals.

Although the foregoing description was of a multipen recorder, the invention is applicable to a one pen recorder. Also, a plurality of similar central processing units (SUB CPU) are used to perform a plurality of different functions, thus enabling manufacture of a mulipen recorder which is substantially reduced in cost. Moreover, the recorder is simply operated using an interactive mode with display using function keys and rotary encoder. The measured data, bar graphs and range information for each channel can be arbitrarily selectively be indicated on the display. Furthermore, since an IC memory card can be used, it is feasible to store set conditions and measured data and effect automatic setting and data output at an arbitrary velocity.

Advantageously, a pen of an adequate pen pressure can be selected in accordance with the recording speed, and even when the recording speed sharply fluctuates, the recorded results with high quality are obtained with the invention. Another advantage to the invention is that a large proportion of the components of the pen mechanism can be made in common and the system as a whole can be readily miniaturized.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A pen recorder apparatus comprising
    at least one pen for writing on a chart;
    measuring means for converting a measured analog signal into a digital signal;
    man-machine interface means operated in an interactive mode with a display for inputting set conditions to said pen recorder apparatus;
    servo controller means for moving said at least one pen in relation to said chart in accordance with a magnitude of said measured analog signal;
    chart feed means for feeding said chart under said set conditions;
    a first bus;
    a main central processing unit; and
    a plurality of subsidiary central processing units connected through said first bus to said main central processing unit, for performing dispersive control of said pen recorder apparatus; wherein
    each of said plurality of subsidiary central processing units is a semiconductor integrated circuit comprising
        a subsidiary central processing element,
        an element for controlling said measuring means,
        an element for controlling said man-machine interface means,
        an element for controlling said servo controller means,
        an element for controlling said chart feed means, and
        a second bus interconnecting said elements to each other.

2. The recorder of claim 1, further comprising a printing unit, under control of said element for controlling said chart feed means, for performing digital printing.

3. The recorder of claim 1, wherein an IC card memory is attachably connected to said first bus.

4. The recorder of claim 1, wherein a dual port memory is connected to said first bus.

5. The recorder of claim 1, wherein said servo controller means comprises a brushless motor having an output shaft, and an optical code plate attached to said output shaft, for outputting signals associated with rotation and magnetic pole positions of a rotor.

6. The recorder of claim 1, wherein said man-machine interface means comprises a rotary encoder.

7. The recorder of claim 1, wherein said display comprises a multidigit matrix display elements, wherein magnitudes of said measured signals are indicated in the form of a bar graph by selectively driving display components of said display elements in the digit direction in accordance with said magnitudes of said measured signals.

8. The recorder of claim 1, wherein said measuring means comprises a plurality of measuring sections and said servo controller means comprises a plurality of servo controllers, and a plurality of said pens are arranged at given spacings in a feeding direction of said chart.

9. The recorder of claim 8, further comprising
sprocket wheels for travelling said chart;
a platen roller partially wound with said chart;
a plurality of pairs of guide shafts disposed at equiangular spacings, each pair of said guide shafts consisting of first and second guide shafts disposed in parallel with each other, said first guide shaft being disposed in a position other than on the periphery around a rotary shaft of said platen roller, said second guide shaft being disposed on the periphery around said rotary shaft of said platen roller
carriages each assuming the same configuration and movably fitted to said second guide shaft of each pair of said guide shafts;
pen holders each assuming the same configuration of and movably fitted to said second guide shaft of each pair of said guide shafts;
a connecting member for connecting said carriage and said pen holder which are fitted to each pair of said guide shafts; and
said pens each assuming the same configuration and attachably fitted to said pen holders.

10. The recorder of claim 9 wherein said sprocket wheels are so installed a to be bilaterally movable in accordance with expansion and contraction of said chart.

11. The recorder of claim 9, wherein the surface of said platen roller has a plurality of grooves therein to coincide cyclically with creases of a folded chart.

12. The recorder of claim 9, wherein each of said second guide shafts assumes a sectional configuration such that a large diameter portion and a small diameter portion are joined, and said pens are simultaneously moved up and down by concurrently rotating said second guide shafts.

13. The recorder of claim 9, further comprising a mechanism for imparting a pen pressure according to a pressing force acting on said pen holder to said pen.

14. The recorder of claim 9, wherein a pen-up block having an inclined surface on which said pen reaching a predetermined position runs, is provided outwardly of an effective record area.

* * * * *